United States Patent
Miyazaki

(10) Patent No.: US 10,720,122 B2
(45) Date of Patent: Jul. 21, 2020

(54) IMAGE PROCESSING APPARATUS AND IMAGE PROCESSING METHOD

(71) Applicant: SONY CORPORATION, Tokyo (JP)

(72) Inventor: Reiko Miyazaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/199,332

(22) Filed: Nov. 26, 2018

(65) Prior Publication Data

US 2019/0096355 A1    Mar. 28, 2019

Related U.S. Application Data

(63) Continuation of application No. 13/667,225, filed on Nov. 2, 2012, now Pat. No. 10,163,419.

(30) Foreign Application Priority Data

Nov. 8, 2011    (JP) .................................. 2011-244377

(51) Int. Cl.
*G09G 5/00*    (2006.01)
*G06Q 30/06*    (2012.01)
*G06T 11/60*    (2006.01)

(52) U.S. Cl.
CPC ........... *G09G 5/00* (2013.01); *G06Q 30/0643* (2013.01); *G06T 11/60* (2013.01); *G09G 2340/12* (2013.01)

(58) Field of Classification Search
CPC .. G09G 5/00; G09G 2340/12; G06Q 30/0643; G05T 11/60
USPC ....................................................... 345/629
See application file for complete search history.

(56) References Cited

U.S. PATENT DOCUMENTS

| | | |
|---|---|---|
| 2003/0146922 A1 | 8/2003 | Navab et al. |
| 2007/0233311 A1 | 10/2007 | Okada et al. |
| 2011/0025689 A1 | 2/2011 | Perez et al. |
| 2011/0110594 A1 | 5/2011 | Hasegawa et al. |
| 2011/0246329 A1* | 10/2011 | Geisner .................. G06F 3/017 705/27.1 |
| 2011/0274314 A1 | 11/2011 | Yang et al. |
| 2012/0092328 A1* | 4/2012 | Flaks .................. G02B 27/017 345/419 |
| 2012/0127199 A1 | 5/2012 | Aarabi |
| 2012/0218423 A1 | 8/2012 | Smith et al. |

(Continued)

FOREIGN PATENT DOCUMENTS

| | | |
|---|---|---|
| CN | 102156810 A | 8/2011 |
| JP | 06-187398 A | 7/1994 |

(Continued)

OTHER PUBLICATIONS

W. Zhang, T. Matsumoto, J. Liu, M. Chu, and B. Begole, "An intelligent fitting room using multi-camera perception," in Proc. Int. Conf. Intelligent User Interfaces, Jan. 2008, pp. 60-69.*

(Continued)

*Primary Examiner* — Jin Ge
(74) *Attorney, Agent, or Firm* — Chip Law Group

(57) ABSTRACT

There is provided an image processing apparatus including an image processing unit which combines a virtual object with a captured image. The image processing unit determines the virtual object based on a state or a type of an object shown in the captured image.

18 Claims, 17 Drawing Sheets

(56) References Cited

U.S. PATENT DOCUMENTS

| | | | |
|---|---|---|---|
| 2012/0306918 A1* | 12/2012 | Suzuki | G06F 3/04845 345/633 |
| 2012/0309520 A1 | 12/2012 | Evertt et al. | |
| 2014/0129990 A1 | 5/2014 | Xin et al. | |
| 2015/0317813 A1 | 11/2015 | Vendrow | |

FOREIGN PATENT DOCUMENTS

| | | |
|---|---|---|
| JP | 09-102033 A | 4/1997 |
| JP | 2004-003058 A | 1/2004 |
| JP | 2004-246729 A | 9/2004 |
| JP | 2005-136841 A | 5/2005 |
| JP | 2006-249618 A | 9/2006 |
| JP | 2012-108806 A | 6/2012 |

OTHER PUBLICATIONS

Hilsmann, A., and Eisert, P. 2009. Tracking and retexturing cloth for real-time virtual clothing applications. In Proceedings of the 4th International Conference on Computer Vision/Computer Graphics CollaborationTechniques, Springer-Verlag, Berlin, Heidelberg, Mirage '09, 94-105.*

B. Spanlang, T. Vassilev, and B. F. Buxton, "Compositing photographs with virtual clothes for design," in Proc. Int. Conf. Comput. Syst. and Technol., 2004, pp. 1-6.*

Office Action for CN Patent Application No. 201210427690.X, dated Jul. 19, 2016, 7 pages of Office Action and 11 pages of English Translation.

Spanlang, et al., "Compositing Photographs with Virtual Clothes for Design", in Proc. Int. Conf. Comput. Syst. and Technol., 2004, 1-6 pages.

Hauswiesner, S., Straka, M., and Reitmayr, G. Oct. 2011. Free viewpoint virtual try-on with commodity depth cameras. In Proc. of International Conference on Virtual Reality Continuum and Its Applications in Industry (VRCAI).

Office Action for JP Patent Application No. 2011-244377, dated Jan. 5, 2016, 4 pages of Office Action.

Herling J and Broil W: Advanced self-contained object removal for realizing real-time Diminished Reality in unconstrained environments, In Proc. of 9th IEEE International Symposium on Mixed and Augmented Reality (ISMAR2010), pp. 207-212, 2010.

Office Action for JP Patent Application No. 2011-244377, dated Jul. 28, 2015.

Liu S., Song Z., Liu G.C., Xu C.S., Lu H.Q., and Yan S.C.Street-to-shop: Cross-scenario clothing retrieval via parts alignment and auxiliary set. In CVPR, Jun. 2012.

Zhang, et al., "An intelligent fitting room using multi-camera perception," in Proc. Int. Conf. Intelligent User Interfaces, Jan. 2008, 60-69 pages.

Leao, et al., "Altered reality: Augmenting and diminishing reality in real time," in IEEE Virtual Reality Conference (VR), Singapore, Mar. 19-23, 2011, 219-220 pages.

Notice of Allowance and Fees Due for U.S. Appl. No. 13/667,225, dated Aug. 8, 2018, 12 pages.

Advisory Action for U.S. Appl. No. 13/667,225, dated Feb. 21, 2018, 3 pages.

Final Rejection for U.S. Appl. No. 13/667,225, dated Nov. 22, 2017, 19 pages.

Non-Final Rejection for U.S. Appl. No. 13/667,225, dated Jun. 7, 2017, 23 pages.

Advisory Action for U.S. Appl. No. 13/667,225, dated Feb. 10, 2017, 3 pages.

Final Rejection for U.S. Appl. No. 13/667,225, dated Nov. 23, 2016, 25 pages.

Non-Final Rejection for U.S. Appl. No. 13/667,225, dated May 10, 2016, 24 pages.

Advisory Action for U.S. Appl. No. 13/667,225, dated Jan. 7, 2016, 3 pages.

Final Rejection for U.S. Appl. No. 13/667,225, dated Nov. 4, 2015, 44 pages.

Non-Final Rejection for U.S. Appl. No. 13/667,225, dated Aug. 27, 2015, 37 pages.

Final Rejection for U.S. Appl. No. 13/667,225, dated Dec. 18, 2014, 26 pages.

Non-Final Rejection for U.S. Appl. No. 13/667,225, dated Aug. 7, 2014, 20 pages.

* cited by examiner

FIG.1
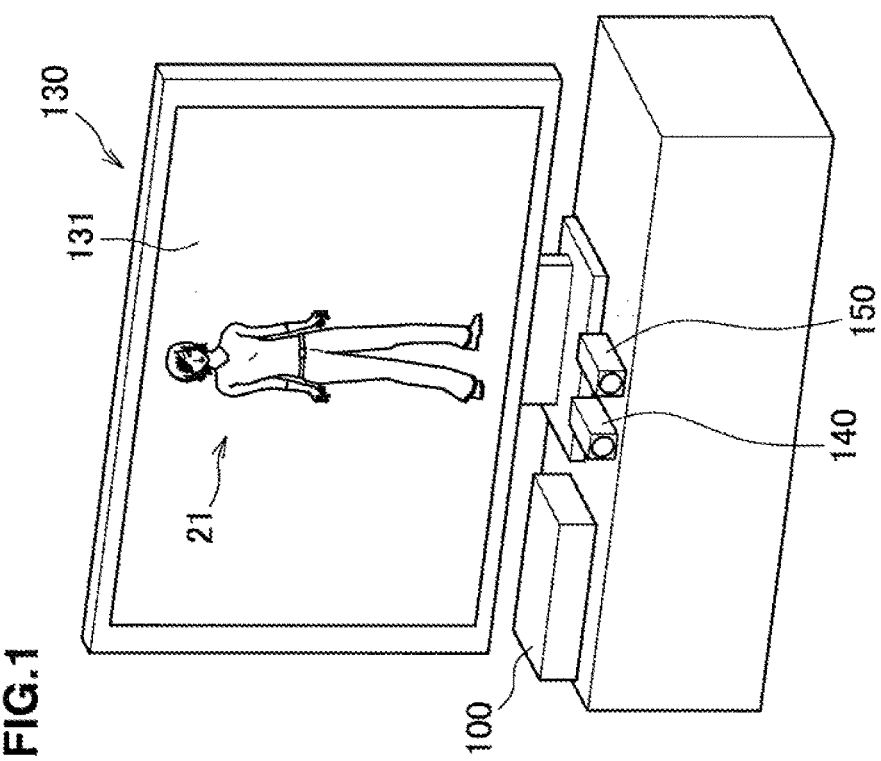
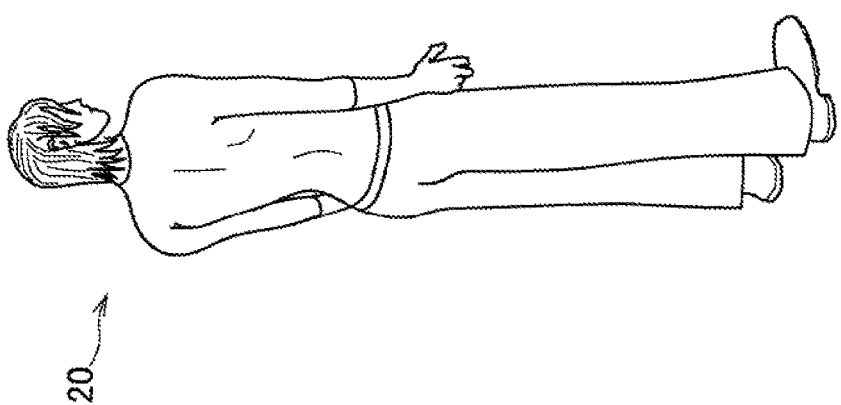

FIG.3
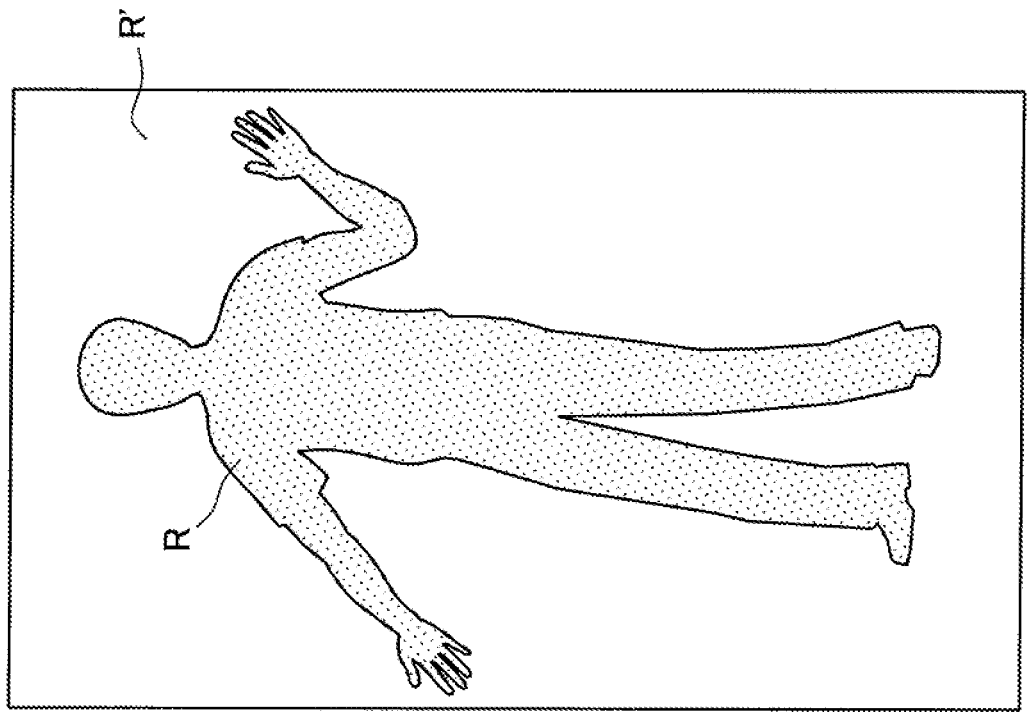
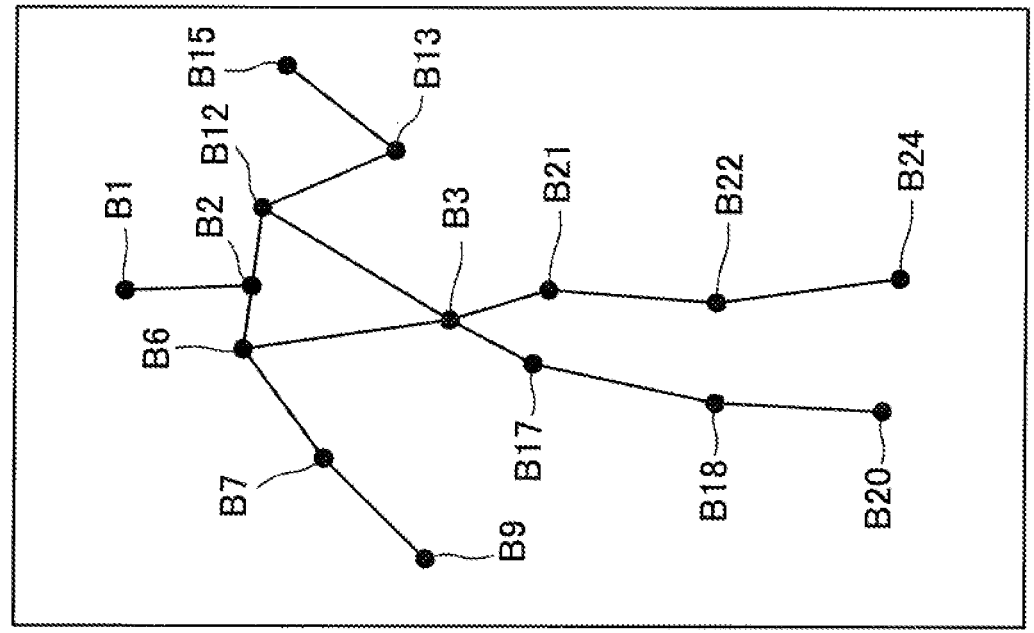

FIG.4
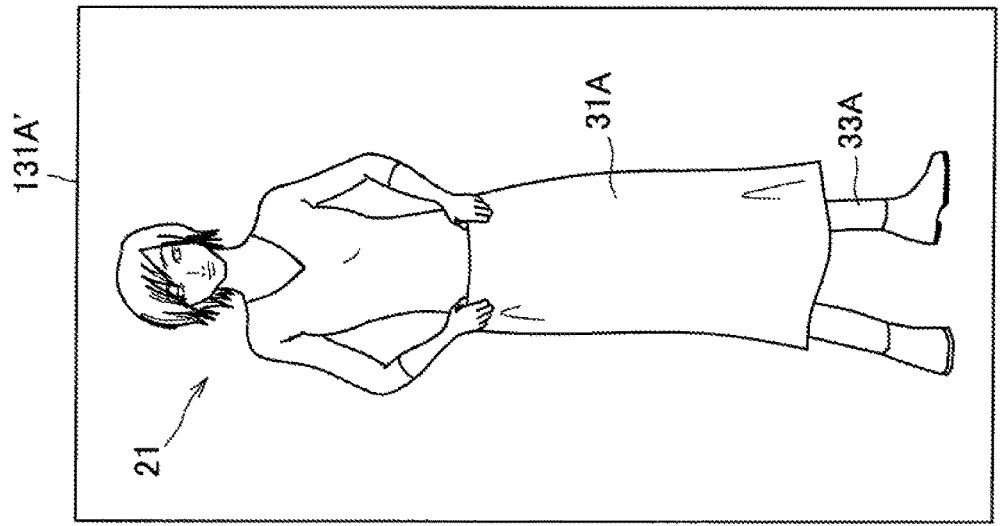
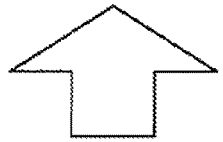
ERASE EXCESS PART OF TROUSERS
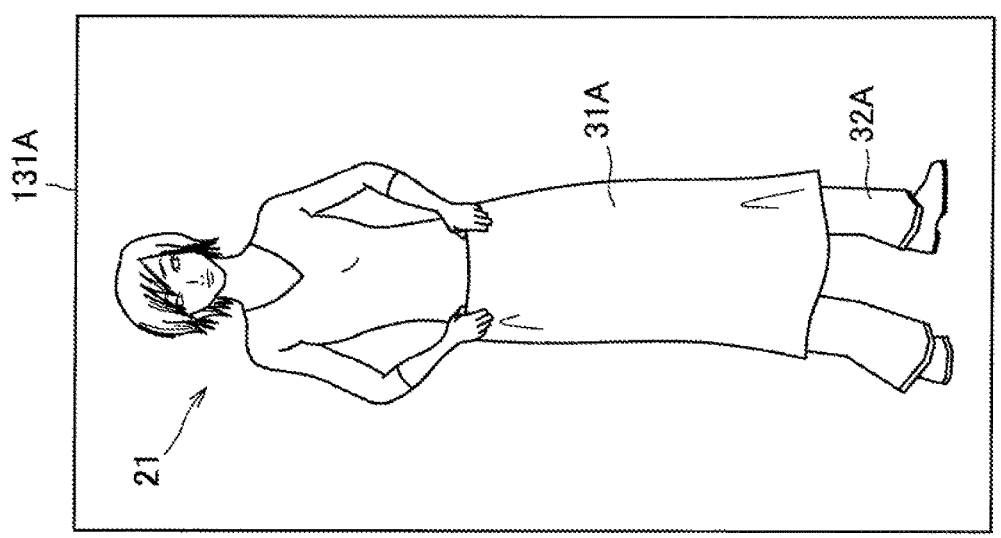

FIG.10
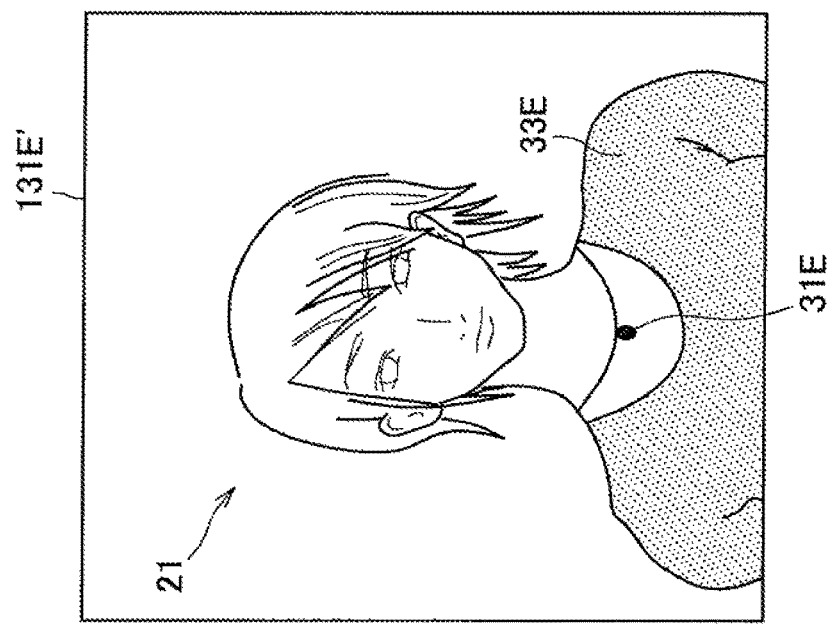
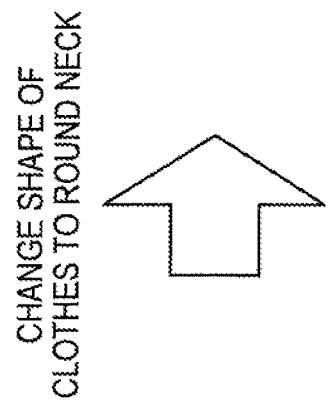
CHANGE SHAPE OF CLOTHES TO ROUND NECK
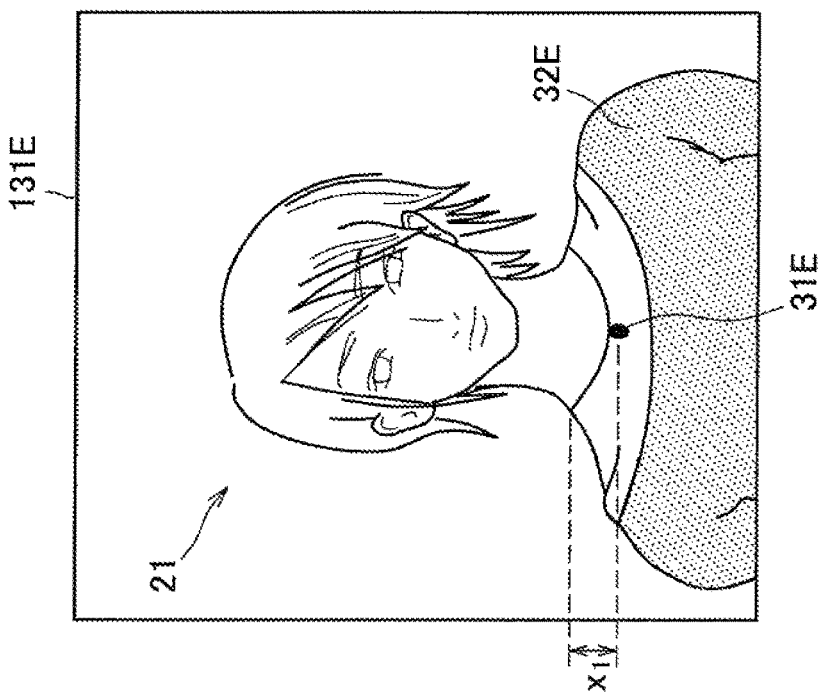

FIG.11
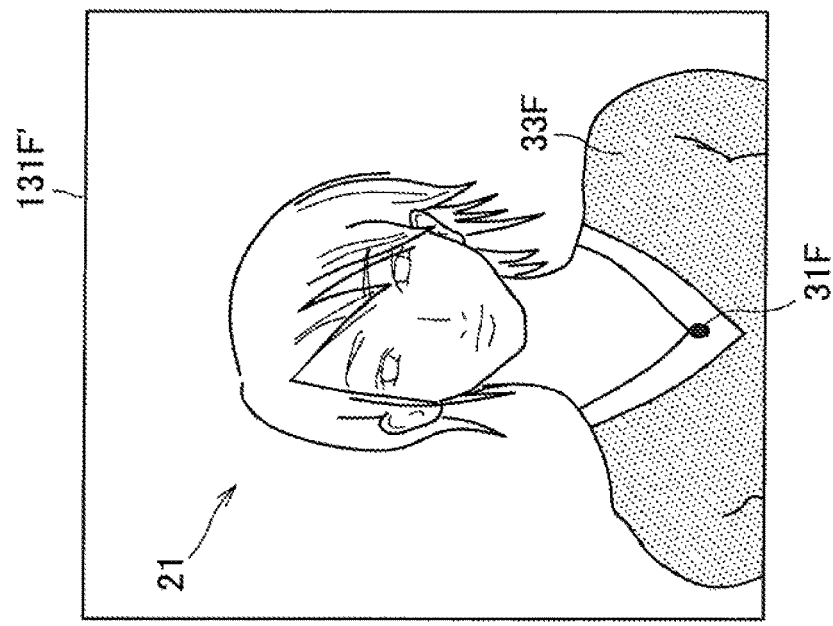
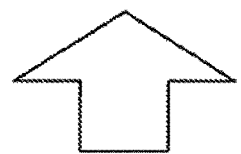
CHANGE SHAPE OF CLOTHES TO V-NECK
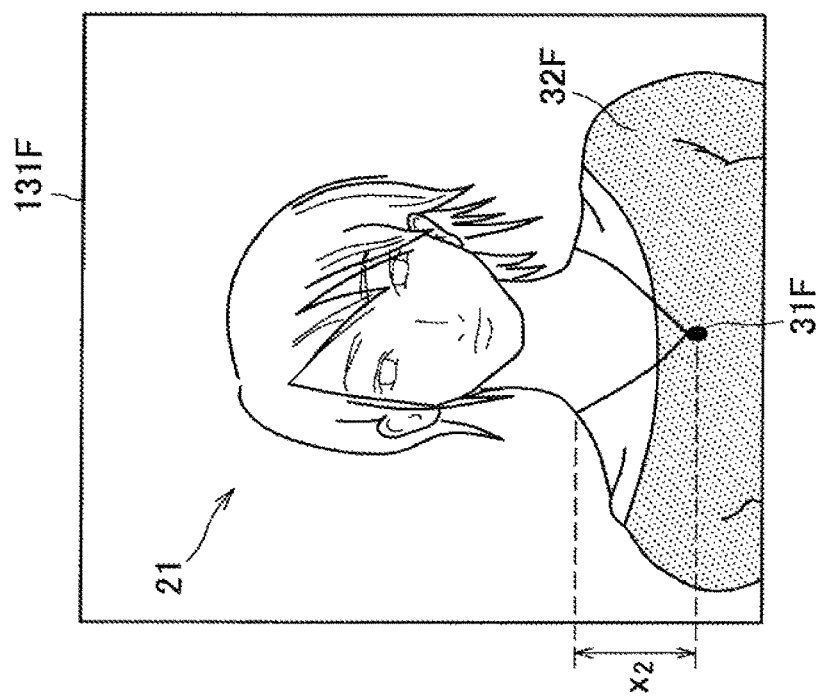

FIG.12
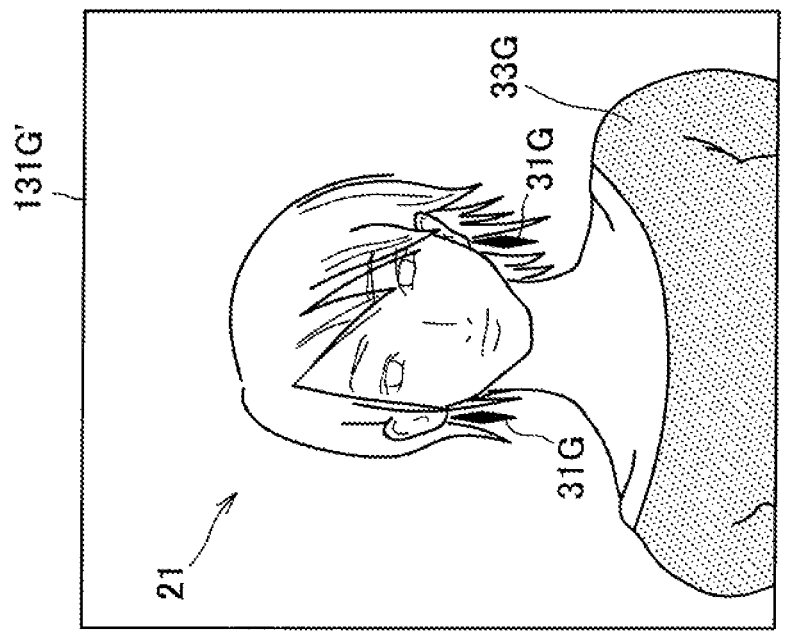
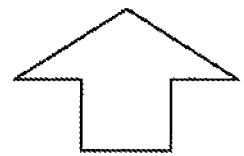
CHANGE SHAPE OF CLOTHES TO BOAT NECK
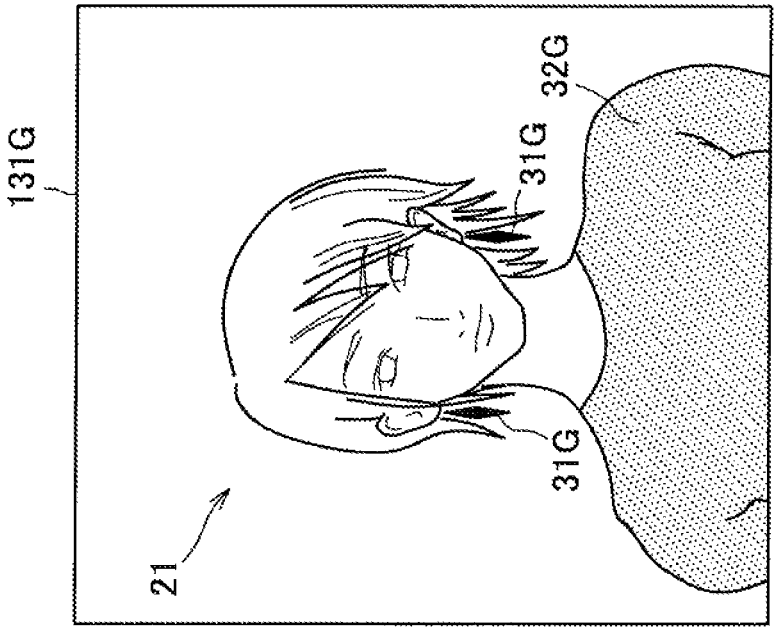

IMAGE PROCESSING APPARATUS AND IMAGE PROCESSING METHOD

CROSS REFERENCE TO RELATED APPLICATIONS

The present application is a continuation application of U.S. patent application Ser. No. 13/667,225, filed Nov. 2, 2012, which claims the priority from Japanese Patent Application JP 2011-244377 filed Nov. 8, 2011, the entire content of which is hereby incorporated by reference.

BACKGROUND

The present disclosure relates to an image processing apparatus, an image processing method, and a program.

In recent years, a technology has been known that combines various objects with an image obtained by capturing (hereinafter, also referred to as "captured image"). Various objects may be combined with a captured image, and, for example, in the case where an image of a subject (such as a person or an animal) is captured, an image of a thing that the subject has on (such as clothes or a bag) may be combined with the captured image as the object. Various technologies are disclosed as the technology for combining an object with a captured image.

For example, a technology for combining an image of clothes with an image of a person is disclosed (for example, see JP 2005-136841A). By looking at a combined image obtained by combining an image of clothes with an image of a person, a user can select clothes knowing how the user would look when the user wears the clothes, even if the user does not actually try on the clothes in a shop.

On the other hand, in addition to the technology for combining an object with a captured image, there is also a technology for modifying a captured image itself. As an example of the technology for modifying a captured image itself, there is given a technology called Diminished Reality. According to the technology, when an object shown in the captured image is specified by a user, the specified object is erased from the captured image.

SUMMARY

However, a technology for performing image processing based on a state or a type of an object shown in a captured image, for example, is not disclosed. Thus, there was a possibility that a captured image was processed without taking into account a state of an object or a type of an object. For example, in the case where a user shown in a captured image placed clothes on his/her body, if clothes that a user already wore came out of the clothes, it was difficult to automatically erase from the captured image the part that came out.

Further, it was also difficult to adjust an object to be combined with a captured image depending on how a user shown in the captured image wore clothes, and to change an object to be combined with a captured image depending on what sort of accessory a user shown in the captured image put on. Therefore, it is desirable that a technology for determining a virtual object to be combined with a captured image based on the state or the type of an object shown in the captured image is realized.

According to an embodiment of the present disclosure, there is provided an image processing apparatus which includes an image processing unit which combines a virtual object with a captured image. The image processing unit determines the virtual object based on a state or a type of an object shown in the captured image.

According to another embodiment of the present disclosure, there is provided an image processing method which includes determining, based on a state or a type of an object shown in a captured image, a virtual object to be combined with the captured image.

According to another embodiment of the present disclosure, there is provided a program for causing a computer to function as an image processing apparatus, the image processing apparatus including an image processing unit which combines a virtual object with a captured image. The image processing unit determines the virtual object based on a state or a type of an object shown in the captured image.

According to the embodiments of the present disclosure described above, a virtual object to be combined with a captured image can be determined based on the state or the type of an object shown in the captured image.

BRIEF DESCRIPTION OF THE DRAWINGS

FIG. 1 is a diagram illustrating an overview of an image processing system according to an embodiment of the present disclosure;

FIG. 3 is a diagram illustrating skeletal structure information and depth information;

FIG. 4 is a diagram illustrating an example of a function of an image processing unit;

FIG. 10 is a diagram illustrating a second modified example of a function of the image processing unit;

FIG. 11 is a diagram illustrating the second modified example of a function of the image processing unit;

FIG. 12 is a diagram illustrating the second modified example of a function of the image processing unit;

DETAILED DESCRIPTION OF THE EMBODIMENT(S)

Figure 2:
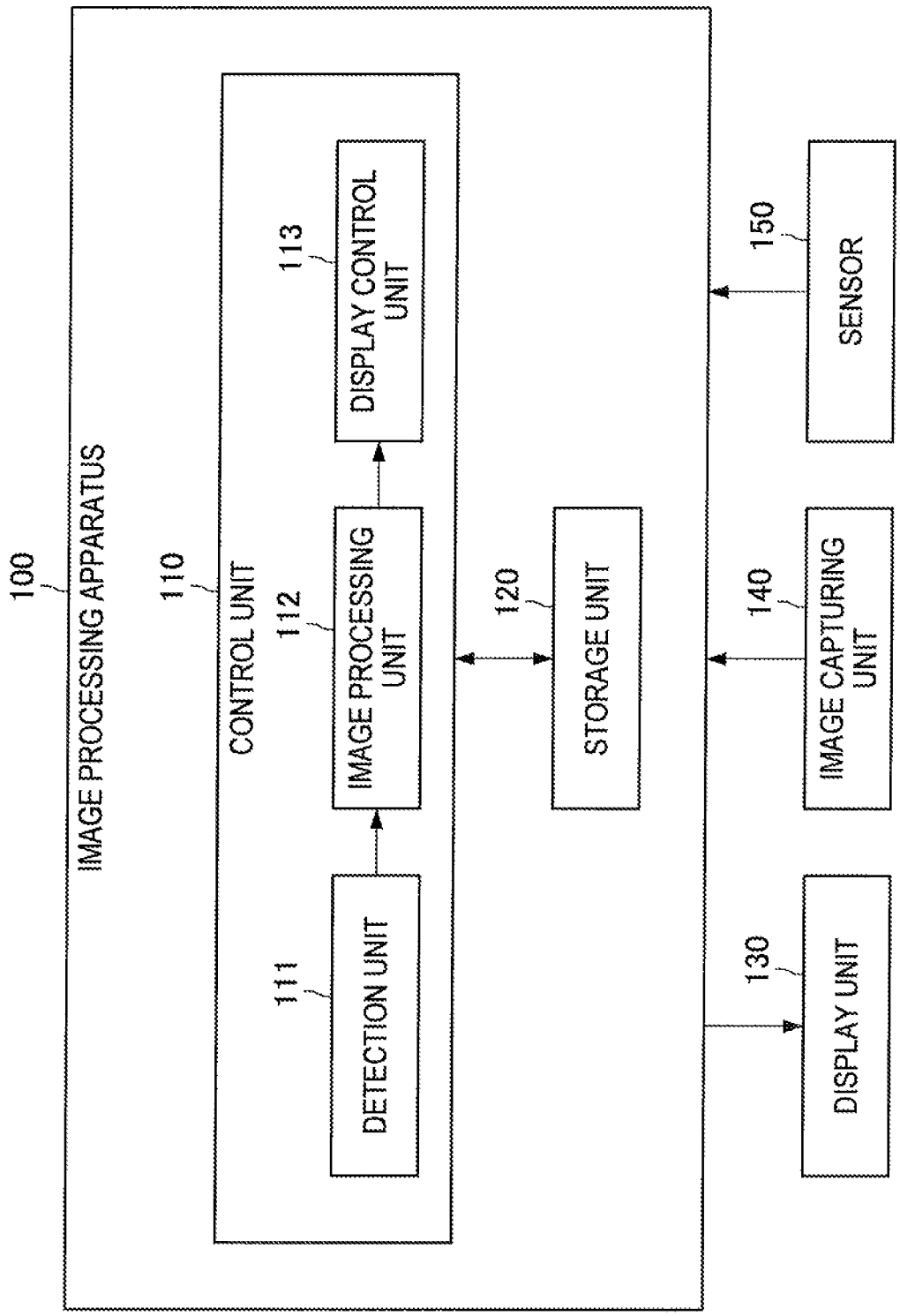
FIG. 2 is a block diagram showing a configuration example of an image processing apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets after the same reference numeral. Note that, in the case where it is not necessary to distinguish the multiple structural elements that have substantially the same function and structure from one another, the multiple structural elements are denoted with the same reference numeral only.

Further, the "detailed description of the embodiments" will be described in the following order.
1. Overview of Image Processing System
2. Functions of Image Processing Apparatus
3. Operation of Image Processing Apparatus
4. Functions in First Modified Example
5. Operation in First Modified Example
6. Functions in Second Modified Example
7. Operation in Second Modified Example
8. Functions in Third Modified Example
9. Operation in Third Modified Example
10. Conclusion

1. OVERVIEW OF IMAGE PROCESSING SYSTEM

In the following, first, an overview of an image processing system according to an embodiment of the present disclosure will be described with reference to FIG. 1.

FIG. 1 is a diagram illustrating an overview of an image processing system according to the embodiment of the present disclosure. As shown in FIG. 1, an image processing system 10 according to the embodiment of the present disclosure includes an image processing apparatus 100, a display unit 130, an image capturing unit 140, and a sensor 150. The place that the image processing system 10 is to be installed is not particularly limited. For example, the image processing system 10 may be installed at the home of a subject 20.

Also, in the example shown in FIG. 1, a plurality of blocks configuring the image processing system 10 (for example, the image processing apparatus 100, the display unit 130, the image capturing unit 140, and the sensor 150) are separately configured, but a combination of some of the plurality of blocks configuring the image processing system 10 may be integrated into one. For example, the plurality of blocks configuring the image processing system 10 may be embedded in a smartphone, a PDA (Personal Digital Assistant), a mobile phone, a portable music reproduction device, a portable video processing device, or a portable game device.

The image capturing unit 140 captures an image of an object existing in the real space. An object existing in the real space is not particularly limited, but may be a living thing such as a person or an animal, or a thing other than the living thing, such as a garage or a TV table, for example. In the example shown in FIG. 1, a subject 20 (for example, a person) is captured by the image capturing unit 140 as the object existing in the real space. An image captured by the image capturing unit 140 (hereinafter, also referred to as "captured image") may be displayed by the display unit 130. The captured image to be displayed by the display unit 130 may be an RGB image. In the example shown in FIG. 1, a captured image 131 showing a subject 21 is displayed by the display unit 130.

The sensor 150 has a function of detecting a parameter in the real space. For example, in the case where the sensor 150 is configured from an infrared sensor, the sensor 150 can detect infrared radiation in the real space, and supply, as detection data, an electric signal according to the amount of infrared radiation to the image processing apparatus 100. The image processing apparatus 100 can recognize the object existing in the real space based on the detection data, for example. The type of the sensor 150 is not limited to the infrared sensor. Additionally, in the example shown in FIG. 1, the detection data is supplied from the sensor 150 to the image processing apparatus 100, but the detection data to be supplied to the image processing apparatus 100 may also be an image captured by the image capturing unit 140.

A captured image is processed by the image processing apparatus 100. For example, the image processing apparatus 100 can process the captured image by combining a virtual object with the captured image according to the recognition result of an object existing in the real space. The display unit 130 can also display a captured image which has been processed by the image processing apparatus 100. For example, in the case the position of the subject 21 is recognized by the image processing apparatus 100, a captured image in which a virtual object (such as an image of clothes) is combined at the position of the subject 21 may be displayed by the display unit 130. Combining of a virtual object may be performed by superimposing an image that is registered in advance and separately from the captured image on the captured image, or by modifying the captured image (for example, by superimposing an image captured from the captured image on the captured image).

By looking at the captured image processed in this manner, the subject 20 can select clothes knowing how he/she would look when he/she has worn the clothes without actually trying the clothes on. However, a technology for performing image processing corresponding to a state or a type of the subject 20 shown in a captured image, for example, is not disclosed. Thus, there was a possibility that a virtual object not taking into account a state or a type of the clothes the subject 20 was wearing was combined with the subject 21. Accordingly, realization of a technology is desired for determining a virtual object to be combined with a captured image based on the state or the type of the object shown in the captured image.

Accordingly, the embodiment of the present disclosure has been attained with the above circumstance in mind. According to the embodiment of the present disclosure, a virtual object to be combined with a captured image can be determined based on the state or the type of the object shown in the captured image. In the following, functions of the image processing apparatus 100 according to the embodiment of the present disclosure will be described with reference to FIGS. 2 to 5.

2. FUNCTIONS OF IMAGE PROCESSING APPARATUS

FIG. 2 is a block diagram showing a configuration example of an image processing apparatus. Referring to FIG. 2, the image processing apparatus 100 includes a control unit 110 and a storage unit 120. The control unit 110 includes a detection unit 111, an image processing unit 112, and a display control unit 113. The display unit 130, the image capturing unit 140, and the sensor 150 are connected to the image processing apparatus 100.

(Control Unit)

The control unit 110 corresponds to a processor such as a CPU (Central Processing Unit) or a DSP (Digital Signal Processor). The control unit 110 causes various functions of the control unit 110 described later to operate, by executing a program stored in the storage unit 120 or other storage media. Additionally, blocks configuring the control unit 110 do not all have to be embedded in the same device, and one or some of them may be embedded in another device (such as a server).

(Storage Unit)

The storage unit 120 stores a program and data for processing of the image processing apparatus 100 using a storage medium such as a semiconductor memory or a hard disk. For example, the storage unit 120 stores a program for causing a computer to function as the control unit 110. Also, for example, the storage unit 120 stores data to be used by the control unit 110. For example, the storage unit 120 can store a feature quantity dictionary to be used for object recognition and virtual objects to be displayed.

(Display Unit)

The display unit 130 is a display module that is configured from an LCD (Liquid Crystal Display), an OLED (Organic Light-Emitting Diode), a CRT (Cathode Ray Tube), or the like. In the embodiment of the present disclosure, the display unit 130 is assumed to be configured separately from the image processing apparatus 100, but the display unit 130 may be a part of the image processing apparatus 100.

(Image Capturing Unit)

The image capturing unit 140 generates a captured image by capturing the real space using an image sensor such as a CCD (Charge Coupled Device) or a CMOS (Complementary Metal Oxide Semiconductor). In the embodiment of the present disclosure, the image capturing unit 140 is assumed to be configured separately from the image processing apparatus 100, but the image capturing unit 140 may be a part of the image processing apparatus 100.

(Sensor)

The sensor 150 has a function of detecting a parameter in the real space. For example, in the case the sensor 150 is configured from an infrared sensor, the sensor 150 can detect infrared radiation in the real space, and supply, as detection data, an electric signal according to the amount of infrared radiation to the image processing apparatus 100. The type of the sensor 150 is not limited to the infrared sensor. Additionally, in the case where an image captured by the image capturing unit 140 is to be supplied to the image processing apparatus 100 as the detection data, the sensor 150 does not have to exist.

(Detection Unit)

The detection unit 111 detects the state or the type of an object shown in a captured image based on detection data. Examples of the state or the type of the object to be detected by the detection unit 111 will be described later, and the state or the type of the object to be detected by the detection unit 111 is not particularly limited. Further, a method of detecting the state or the type of the object shown in the captured image is not particularly limited. For example, the detection unit 111 matches the feature quantity determined from the captured image against the feature quantity of an object, and can thereby recognize the state or the type of the object included in the captured image.

More specifically, the detection unit 111 determines a feature quantity in a captured image according to a feature quantity determination method such as SIFT method or Random Ferns method, and matches the determined feature quantity against the feature quantity of an object. Then, the detection unit 111 recognizes the type of the object associated with a feature quantity that best matches the feature quantity in the captured image (for example, information which is for identifying the object), and the state of the object in the captured image (for example, the position and the attitude of the object).

Here, a feature quantity dictionary in which feature quantity data of objects and information for identifying types of objects are associated is used by the detection unit 111. This feature quantity dictionary may be stored in the storage unit 120, or may be received from a server. The feature quantity data of an object may be a collection of feature quantities determined from images for learning of an object according to SIFT method or Random Ferns method, for example.

Alternatively, the detection unit 111 can also detect the state or the type of the object by matching a feature quantity determined from the detection data supplied from the sensor 150, instead of the captured image, against the feature quantity of the object. In this case, for example, the detection unit 111 can detect the state or the type of the object based on the detection data supplied from the sensor 150 using a method similar to the method of detecting the state or the type of the object from the captured image.

The state or the type of an object shown in a captured image can be detected based on detection data by a method as described above. The detection unit 111 may also be integrated not in the image processing apparatus 100, but in the sensor 150.

As in the case of recognizing an object, the detection unit 111 can recognize a part of an object included in a captured image by matching a feature quantity determined from the captured image against a feature quantity of each part of the object. Alternatively, the detection unit 111 can recognize a part of an object by matching a feature quantity determined from the detection data supplied from the sensor 150, instead of the captured image, against the feature quantity of each part of the object.

A known art (for example, Kinect (registered trademark) developed by Microsoft Corporation (registered trademark)) can be used to detect the state of an object. By using such a known art, the detection unit 111 can acquire skeletal structure information as an example of coordinates showing the position of each of one or more parts forming the subject 20. The detection unit 111 can detect the state of the subject 20 based on the skeletal structure information. Alternatively, the detection unit 111 can detect the state of the subject 20 based on the skeletal structure information and depth information. First, the skeletal structure information and the depth information will be described with reference to FIG. 3.

FIG. 3 is a diagram illustrating skeletal structure information and depth information. The detection unit 111 can acquire skeletal structure information as shown in FIG. 3 by using the known art described above. In the example shown in FIG. 3, the skeletal structure information is shown as coordinates B1 to B3, B6, B7, B9, B12, B13, B15, B17, B18, B20 to B22, and B24 showing 15 parts forming the subject 20, but the number of parts included in the skeletal structure information is not particularly limited.

Additionally, the coordinates B1 represent the coordinates of "Head", the coordinates B2 represent the coordinates of "Neck", the coordinates B3 represent the coordinates of "Torso", the coordinates B6 represent the coordinates of "Left Shoulder", and the coordinates B7 represent the coordinates of "Left Elbow". Also, the coordinates B9 represent the coordinates of "Left Hand", the coordinates B12 represent the coordinates of "Right Shoulder", the coordinates B13 represent the coordinates of "Right Elbow", and the coordinates B15 represent the coordinates of "Right Hand".

The coordinates B17 represent the coordinates of "Left Hip", the coordinates B18 represent the coordinates of "Left Knee", the coordinates B20 represent the coordinates of "Left Foot", and the coordinates B21 represent the coordinates of "Right Hip". The coordinates B22 represent the coordinates of "Right Knee", and the coordinates B24 represent the coordinates of "Right Foot".

Further, the detection unit 111 can acquire depth information as shown in FIG. 3 by using the known art described above. The depth information is information indicating the distance from the sensor 150, and, in FIG. 3, an object existing region R where the depth is below a threshold value (a region where the distance from the sensor 150 is less than the threshold value) and other region R' are shown as examples of the depth information for the sake of simplicity.

(Image Processing Unit)

The image processing unit 112 processes a captured image based on the state or the type of an object shown in the captured image. The state or the type of an object shown in the captured image may be detected by the detection unit 111 as described above. No particular limitation is imposed as to how the image processing unit 112 processes the captured image. For example, as described above, the image processing unit 112 can process the captured image by combining a virtual object with the captured image based on the state or the type of an object shown in the captured image. As described above, combining of a virtual object may be performed by superimposing an image that is registered in advance and separately from the captured image on the captured image, or by modifying the captured image (for example, by superimposing an image captured from the captured image on the captured image).

Subsequently, an example of a function of the image processing unit 112 will be described with reference to FIG. 4 and FIG. 5. FIG. 4 is a diagram illustrating an example of a function of the image processing unit 112.

For example, in the case where the adjacency of an object shown in a captured image and a predetermined object shown in the captured image is detected, the image processing unit 112 may combine a virtual object with the captured image by processing of replacing the object shown in the captured image with another object. FIG. 4 shows an object 31A as an example of the object shown in a captured image 131A, and an object 32A as an example of the predetermined object shown in the captured image 131A. Further, FIG. 4 shows an object 33A as an example of the other object. Further, in the example shown in FIG. 4, the object 31A is a skirt, the object 32A is a pair of trousers, and the object 33A is a leg. However, the object 31A, the object 32A, and the object 33A are not particularly limited.

In the captured image 131A, the subject 21 wears the trousers, and places the skirt on the trousers. By looking at the displayed captured image 131A, the subject 20 can know how he/she would look when he/she has worn the skirt. However, in the captured image 131A, the trousers come out from the bottom of the skirt, but on the other hand, when the subject 20 actually wears the skirt, his/her legs are supposed to come out from the bottom of the skirt. Thus, the subject 20 grasps, from the captured image 131A, an appearance different from how he/she would look when he/she has actually worn the skirt.

Accordingly, in the case where the adjacency of the skirt and the trousers is detected, the image processing unit 112 may replace the trousers with legs (for example, skin-colored part). FIG. 4 shows a captured image 131A' in which an excess part of the trousers that comes out of the skirt is erased and the part is replaced with the legs by the image processing unit 112. The adjacency of the skirt and the trousers is detected by the detection unit 111, and the detection method is not particularly limited.

For example, the adjacency of the object shown in a captured image and the predetermined object may be detected based on at least one of the color or the shape of the object that is adjacent to the object shown in the captured image. For example, the detection unit 111 determines whether the shape of an excess part that comes out of the skirt is a leg shape, and in the case of determining that the excess part is not the leg shape, since it is the presumed that trousers are coming out of the skirt, the adjacency of the skirt and the trousers may be detected.

Further, for example, the detection unit 111 determines whether the color of the excess part that comes out of the skirt is a leg color (for example, skin color), and in the case of determining that the color of the excess part is not the leg color, since it is presumed that the trousers are coming out of the skirt, the adjacency of the skirt and the trousers may be detected. In addition, even though the detection unit 111 determines that the color of the excess part that comes out of the skirt is the leg color, in the case where the excess part with the leg color does not have a size exceeding a threshold, since it is not presumed that the leg-colored part is a leg, the adjacency of the skirt and the trousers may be detected.

In this way, the detection unit 111 can detect the adjacency of the skirt and the trousers based on the shape or the color of the excess part that comes out of the skirt. The leg shape or the leg color may be registered in advance, or may be accumulated by learning. Note that, in the case where the adjacency of an object shown in a captured image and a predetermined object superimposed on the captured image is detected, the image processing unit 112 may combine a virtual object with the captured image by processing of replacing the object shown in the captured image with another object. In the example shown in FIG. 4, the subject 20 places the skirt existing in a real space on his/her body, and also in the case where a skirt, which is a virtual object, is placed on the body of the subject 21, the processing of erasing the excess part of the trousers that comes out of the skirt may be executed.

Figure 5:
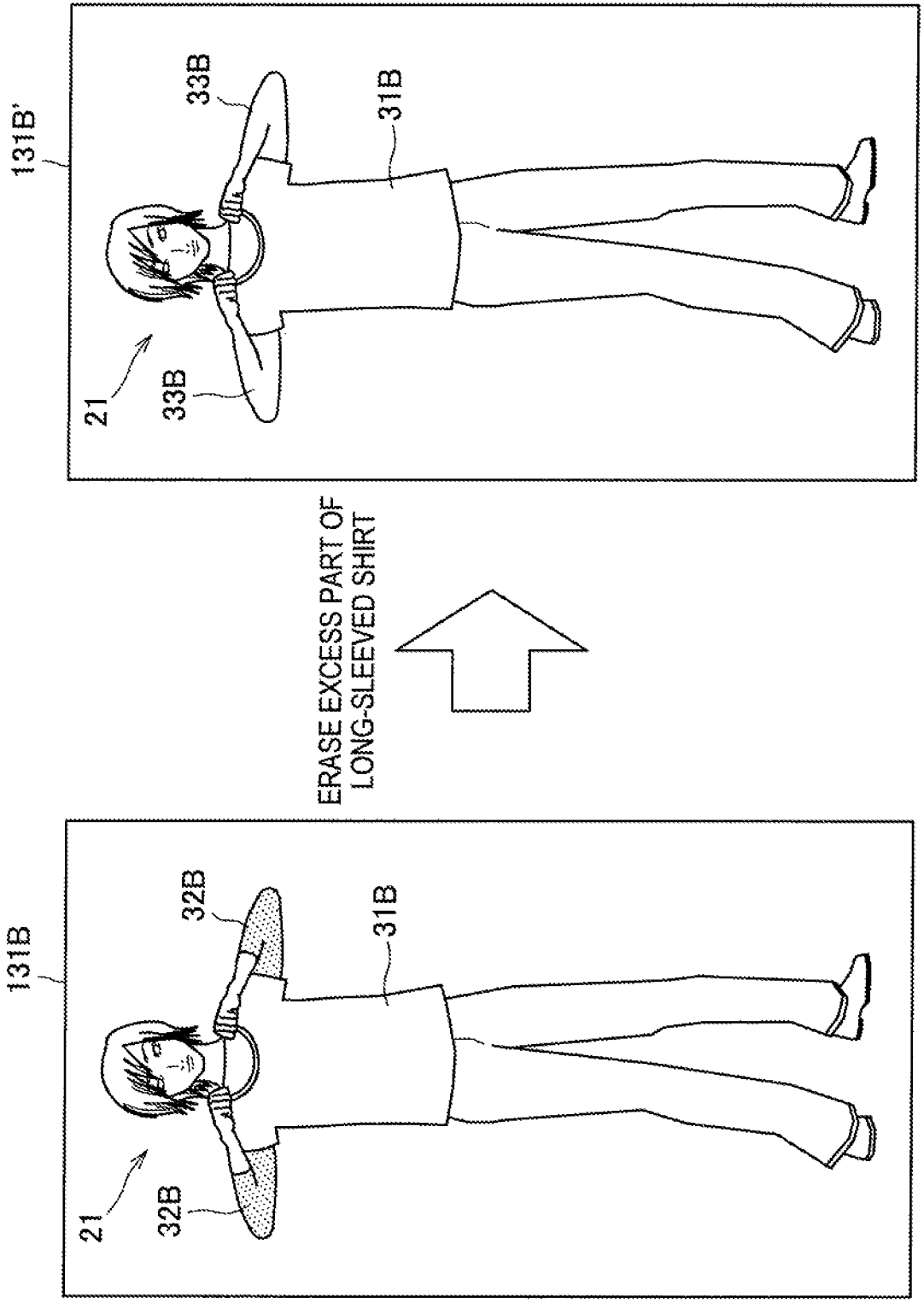
FIG. 5 is a diagram illustrating an example of a function of the image processing unit.

FIG. 5 is a diagram illustrating an example of a function of the image processing unit 112. FIG. 5 shows an object 31B as an example of the object shown in a captured image 131B, and an object 32B as an example of the predetermined object shown in the captured image 131B. Further, FIG. 5 shows an object 33B as an example of the other object. Further, in the example shown in FIG. 5, the object 31B is a short-sleeved shirt, the object 32B is a long-sleeved shirt, and the object 33B is an arm. However, the object 31B, the object 32B, and the object 33B are not particularly limited.

In the captured image 131B, the subject 21 wears the long-sleeved shirt, and places the short-sleeved shirt on the long-sleeved shirt. By looking at the displayed captured image 131B, the subject 20 can know how he/she would look when he/she has worn the short-sleeved shirt. However, in the captured image 131B, the long-sleeved shirt comes out from under the short-sleeved shirt, but on the other hand, when the subject 20 actually wears the short-sleeved shirt, his/her arms are supposed to come out from under the short-sleeved shirt. Thus, the subject 20 grasps, from the captured image 131B, an appearance different from how he/she would look when he/she has actually worn the short-sleeved shirt.

Accordingly, in the case where the adjacency of the long-sleeved shirt and the short-sleeved shirt is detected, the image processing unit 112 may replace the long-sleeved shirt with arms (for example, skin-colored part). FIG. 5 shows a captured image 131B' in which an excess part of the long-sleeved shirt that comes out of the short-sleeved shirt is erased and the excess part is replaced with the arms by the image processing unit 112. The adjacency of the long-sleeved shirt and the short-sleeved shirt is detected by the detection unit 111, and the detection method is not particularly limited. For example, the detection unit 111 determines whether the shape of an excess part that comes out of the short-sleeved shirt is an arm shape, and in the case of determining that the excess part is not the arm shape, since it is presumed that the long-sleeved shirt is coming out of the short-sleeved shirt, the adjacency of the long-sleeved shirt and the short-sleeved shirt may be detected.

Further, for example, the detection unit 111 determines whether the color of the excess part that comes out of the short-sleeved shirt is an arm color (for example, skin color), and in the case of determining that the color of the excess part is not the arm color, since it is presumed that the long-sleeved shirt are coming out of the short-sleeved shirt, the adjacency of the short-sleeved shirt and the long-sleeved shirt may be detected. In addition, even though the detection unit 111 determines that the color of the excess part that comes out of the short-sleeved shirt is the arm color, in the case where the excess part with the arm color does not have a size exceeding a threshold, since it is not presumed that the arm-colored part is an arm, the adjacency of the short-sleeved shirt and the long-sleeved shirt may be detected.

In this way, the detection unit 111 can detect the adjacency of the short-sleeved shirt and the long-sleeved shirt based on the shape or the color of the excess part that comes out of the short-sleeved shirt. The arm shape or the arm color may be registered in advance, or may be accumulated by learning. Note that, in the example shown in FIG. 5, the subject 20 places the short-sleeved shirt existing in a real space on his/her body, and also in the case where a short-sleeved shirt, which is a virtual object, is placed on the body of the subject 21, the processing of erasing the excess part of the long-sleeved shirt that comes out of the short-sleeved shirt may be executed.

Note that, even if an excess part that comes out of clothes is present, there is also a case where it is preferred that the part be not erased. For example, it is represented by the following case: when the subject 20 wears a jacket on top of a shirt which he/she has already worn, the subject 20 wants to know how he/she would look in a state without the shirt being erased. In order to satisfy such a requirement, for example, in the case where the object shown in the captured image is adjacent to the predetermined object shown in the captured image at a predetermined position, the predetermined object shown in the captured image may not be replaced with the other object.

For example, if the shirt comes out of the jacket and the excess part that comes out of the jacket is a neck of the subject 21, the image processing unit 112 may not replace the predetermined object shown in the captured image with the neck (for example, skin-colored part). Accordingly, in the case where an adjacent position is a predetermined position (for example, arm position or leg position), the image processing unit 112 may replace the object that is adjacent to the object shown in the captured image with the other object, and in the case where the adjacent position is another position (for example, neck position), the image processing unit 112 may not replace the object that is adjacent to the object shown in the captured image with the other object. The adjacent position may be determined based on the captured image, or may be determined based on the skeletal structure information.

(Display Control Unit)

The display unit 130 is controlled by the display control unit 113 such that a captured image with which the virtual object has been combined by the image processing unit 112 is displayed on the display unit 130.

Heretofore, the examples of the functions of the image processing apparatus 100 according to the embodiment of the present disclosure have been described with reference to FIG. 4 and FIG. 5. In the following, an example of a flow of operation of the image processing apparatus 100 according to the embodiment of the present disclosure will be described with reference to FIG. 6.

3. OPERATION OF IMAGE PROCESSING APPARATUS

Figure 6:
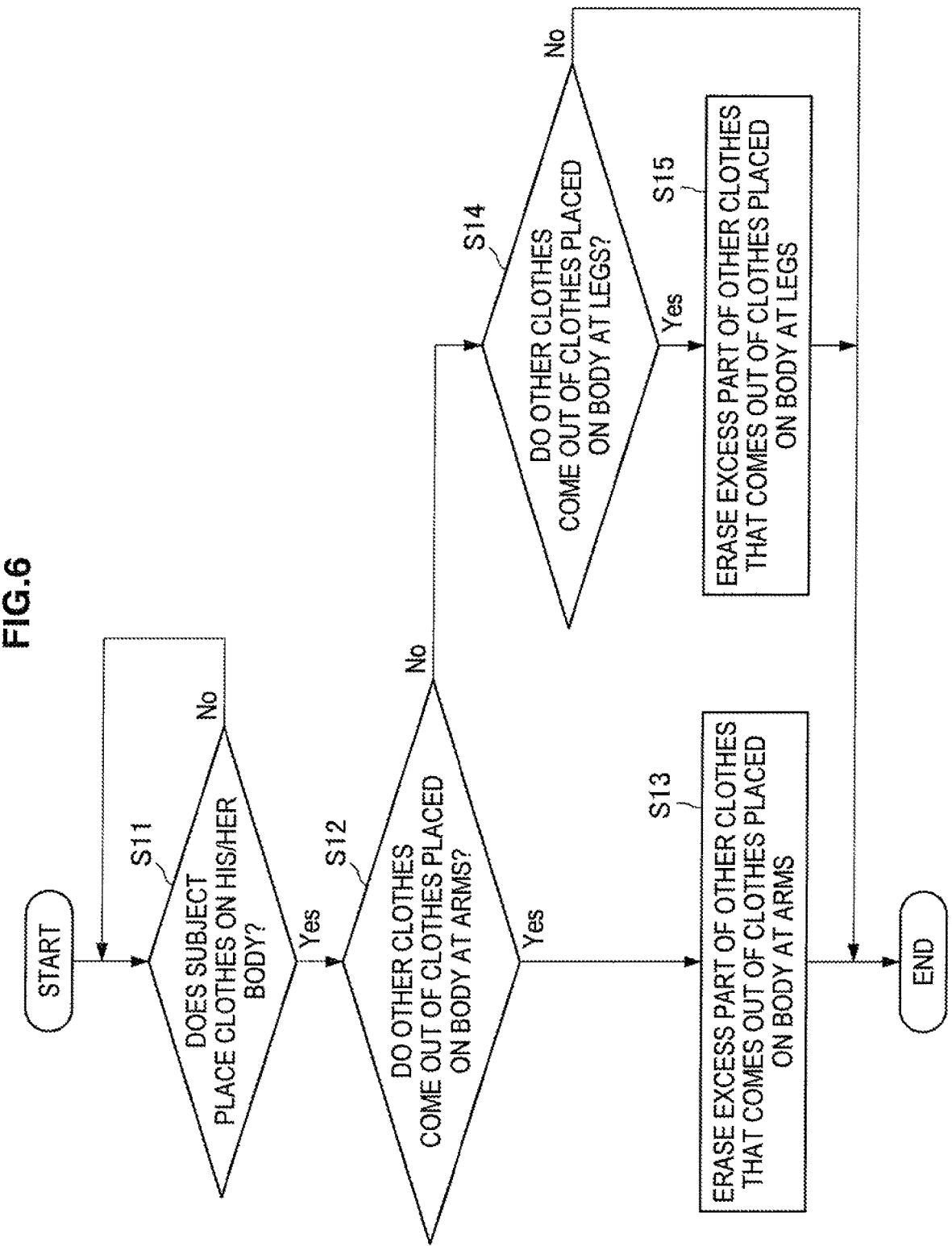
FIG. 6 is a flowchart showing an example of a flow of operation of the image processing apparatus.

FIG. 6 is a flowchart showing an example of a flow of operation of the image processing apparatus 100 according to the embodiment of the present disclosure. Note that the operation of the image processing apparatus 100 to be described with reference to FIG. 6 is particularly operation of the image processing apparatus 100 in the case of detecting a state of clothes that the subject 20 wears. The clothes that the subject 20 wears are an example of the object shown in the captured image.

As shown in FIG. 6, first, in the case where the subject 21 does not place clothes on his/her body ("No" in Step S11), the detection unit 111 returns to Step S11. On the other hand, in the case where the subject 21 places clothes on his/her body ("Yes" in Step S11), the detection unit 111 detects the state of the clothes. In the case where it is detected that other clothes come out of the clothes placed on the body at the arms of the subject 20 ("Yes" in Step S12), the image processing unit 112 erases an excess part of the other clothes that comes out of the clothes placed on the body at the arms (Step S13).

On the other hand, in the case where it is not detected that the other clothes come out of the clothes placed on the body at the arms of the subject 20 ("No" in Step S12), the image processing unit 112 proceeds to Step S14. In the case where it is detected that other clothes come out of the clothes placed on the body at the legs of the subject 20 ("Yes" in Step S14), the image processing unit 112 erases an excess part of the other clothes that comes out of the clothes placed on the body at the legs (Step S15).

On the other hand, in the case where it is not detected that the other clothes come out of the clothes placed on the body at the legs of the subject 20 ("No" in Step S14), the image processing unit 112 may not erase the excess part of the other clothes that comes out of the clothes placed on the body at the legs. The display unit 130 may be controlled by the display control unit 113 such that a captured image processed by the image processing unit 112 is displayed on the display unit 130.

Heretofore, the example of the flow of operation of the image processing apparatus 100 has been described with reference to FIG. 6.

4. FUNCTIONS IN FIRST MODIFIED EXAMPLE

Figure 7:
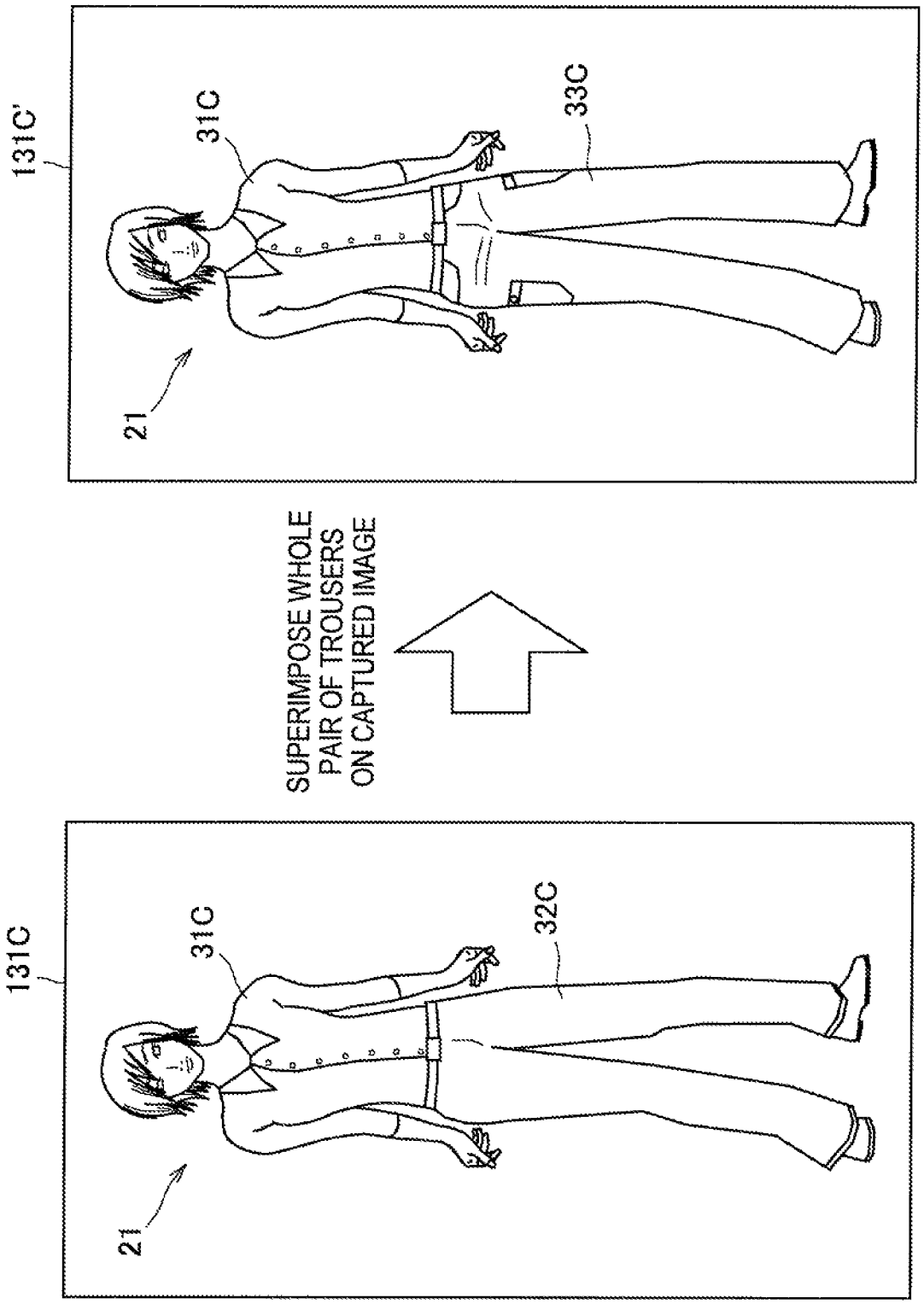
FIG. 7 is a diagram illustrating a first modified example of a function of the image processing unit.

Subsequently, a first modified example of functions of the image processing unit 112 will be described with reference to FIG. 7 and FIG. 8. FIG. 7 is a diagram illustrating a first modified example of a function of the image processing unit 112.

For example, in the case where an overlap between an object shown in a captured image and a predetermined object shown in the captured image is detected, the image processing unit 112 may combine, with the captured image, a virtual object modified in accordance with the overlap. FIG. 7 shows an object 31C as an example of the object shown in a captured image 131C, and an object 32C as an example of the predetermined object shown in the captured image 131C. Further, in the example shown in FIG. 7, the object 31C is a shirt, the object 32C is a pair of trousers, and the object 33C is a pair of trousers. However, the object 31C, the object 32C, and the object 33C are not particularly limited.

In the captured image 131C, the subject 21 wears the trousers and the shirt. By looking at the captured image in which the trousers are combined with the captured image 131C, the subject 20 can know how he/she would look when he/she has worn the trousers. However, if the whole pair of trousers is uniformly combined with the captured image 131C regardless of whether the shirt hangs out of the trousers, it is difficult to obtain a captured image that naturally reflects a manner in which the subject 20 wears the trousers. Thus, the subject 20 grasps an appearance of the case of wearing the trousers different from the manner of the way the subject 20 would wear the trousers.

Accordingly, in the case where an overlap between the shirt and the trousers is detected, the image processing unit 112 may combine, with the captured image, the trousers modified in accordance with the overlap. FIG. 7 shows a captured image 131C' in which the whole pair of trousers is combined with the captured image 131C, since the overlap between the shirt and the trousers is not detected by the image processing unit 112. The overlap between the shirt and the trousers is detected by the detection unit 111, and the detection method is not particularly limited.

For example, the overlap between the object shown in a captured image and the predetermined object may be detected based on a position of a boundary line between the object shown in the captured image and the predetermined object. For example, the detection unit 111 determines whether the position of the boundary line between the shirt and the trousers is a position of the waist of the subject 21, and in the case of determining that the position of the boundary line is the position of the waist of the subject 21, since it is presumed that the subject 20 tucks the shirt in the trousers, the overlap between the shirt and the trousers may be detected. Among the objects shown in the captured image, the detection unit 111 may regard a white area as a shirt area, and may regard the bottom edge of the shirt area as the boundary line between the shirt and the trousers. The position of the waist may be determined based on the captured image, or may be determined based on the skeletal structure information. Further, the position of the waist may also include the position in the vicinity of the waist.

Further, for example, the detection unit 111 may detect the overlap between the shirt and the trousers in the case where the position of the boundary line is the position of the waist of the subject 21 and the boundary line is similar to a straight line. For example, the detection unit 111 may detect the overlap between the shirt and the trousers in the case where the bottom edge of the shirt area is approximated by multiple points and the line obtained by connecting the multiple points is similar to the straight line. The range of similarity can be set in advance. In this way, the detection unit 111 can detect the overlap between the shirt and the trousers based on the position of the boundary line between the shirt and the trousers.

Figure 8:
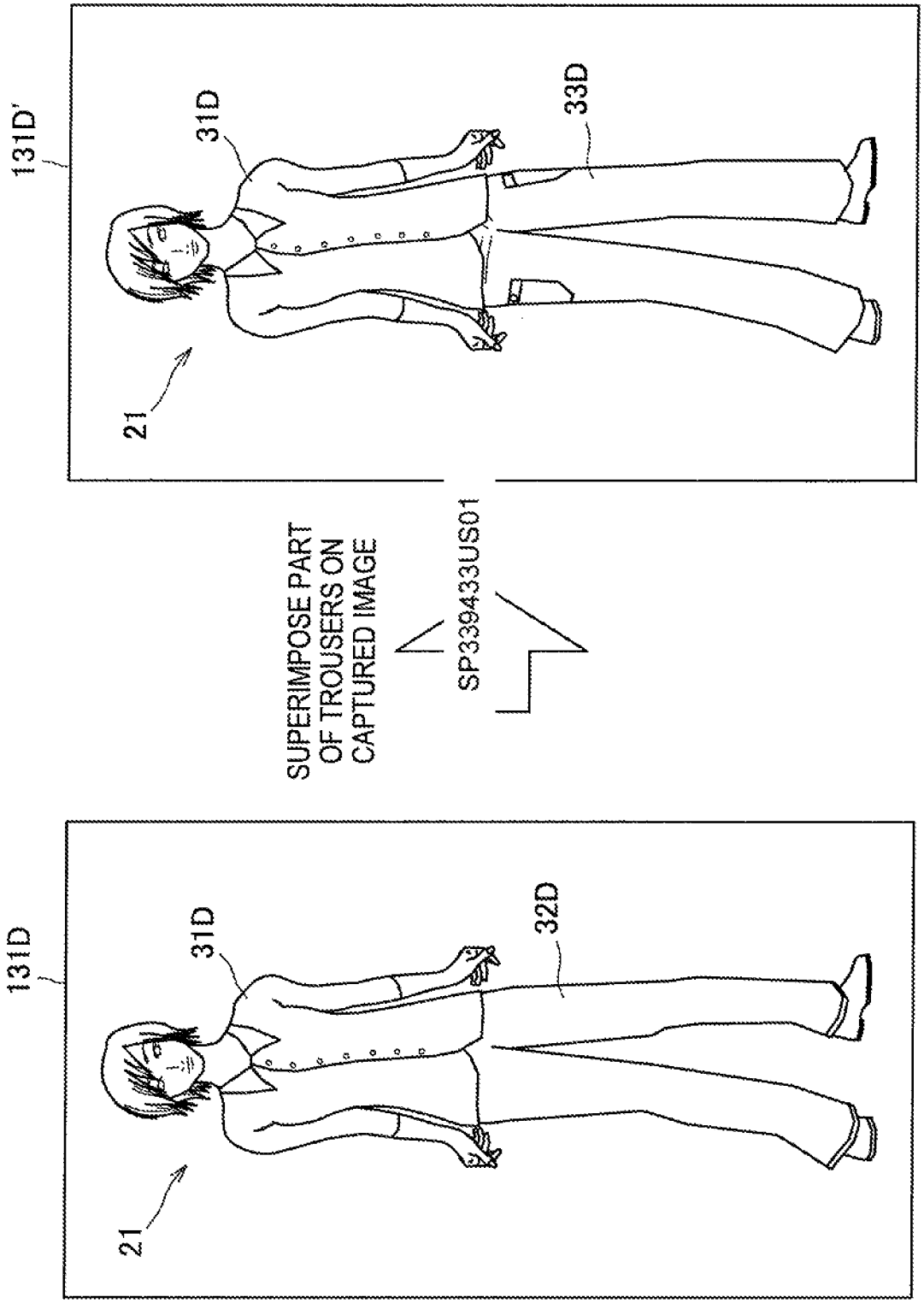
FIG. 8 is a diagram illustrating the first modified example of a function of the image processing unit.

FIG. 8 is a diagram illustrating a modified example of a function of the image processing unit 112. FIG. 8 shows an object 31D as an example of the object shown in a captured image 131D, and an object 32D as an example of the predetermined object shown in the captured image 131D. Further, in the example shown in FIG. 8, the object 31D is a shirt, the object 32D is a pair of trousers, and the object 33D is a pair of trousers. However, the object 31D, the object 32D, and the object 33D are not particularly limited.

As described above, in the case where the overlap between the shirt and the trousers is detected, the image processing unit 112 may combine, with the captured image, the trousers modified in accordance with the overlap. FIG. 8 shows a captured image 131D' in which a part of the trousers is combined with the captured image 131C, since the overlap between the shirt and the trousers is detected by the image processing unit 112. The overlap between the shirt and the trousers is detected by the detection unit 111, and the detection method is not particularly limited. The example of the detection method is as described above.

Heretofore, the first modified example of the functions of the image processing apparatus 100 according to the embodiment of the present disclosure has been described with reference to FIG. 7 and FIG. 8. In the following, an example of a flow of operation of the image processing apparatus 100 according to the first modified example will be described with reference to FIG. 9.

5. OPERATION IN FIRST MODIFIED EXAMPLE

Figure 9:
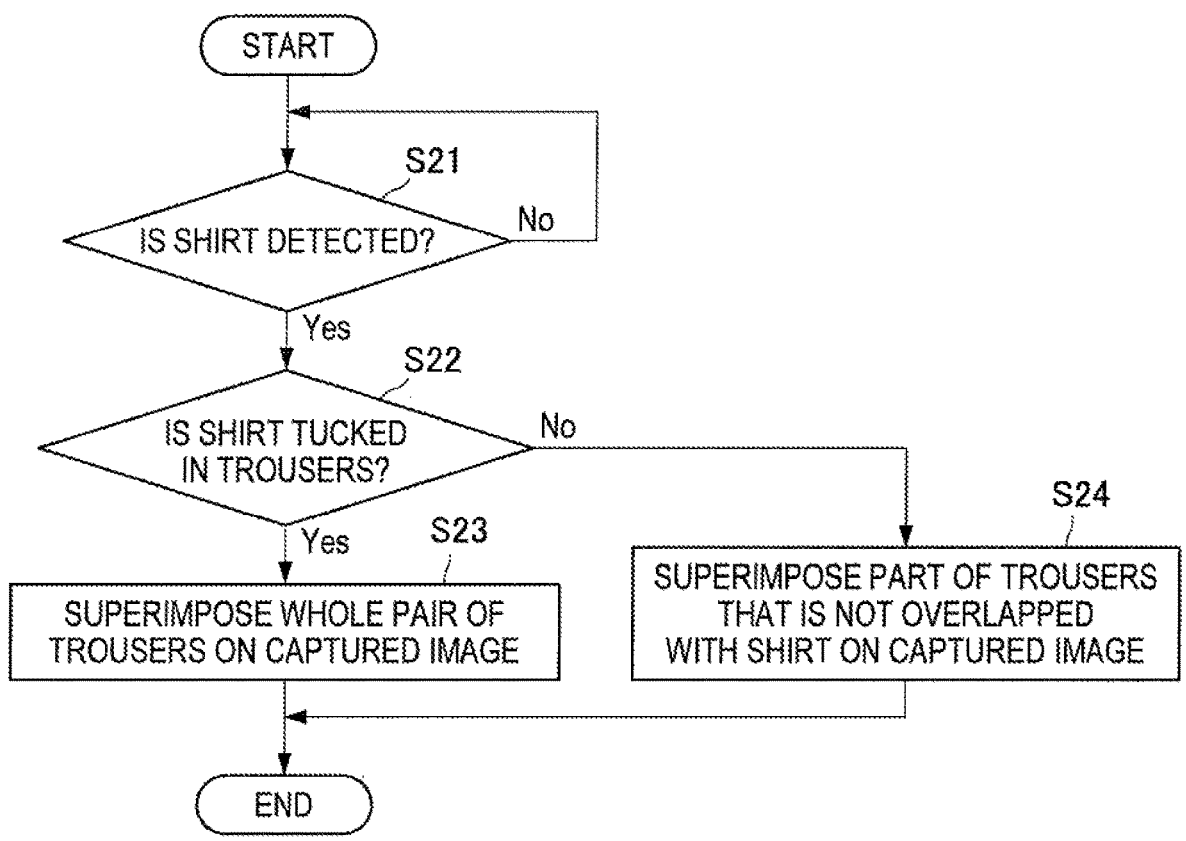
FIG. 9 is a flowchart showing a flow of operation of an image processing apparatus according to the first modified example.

FIG. 9 is a flowchart showing a flow of operation of the image processing apparatus 100 according to the first modified example. Note that the operation of the image processing apparatus 100 to be described with reference to FIG. 9 is particularly operation of the image processing apparatus 100 in the case of detecting a state of a shirt that the subject 20 wears. The shirt that the subject 20 wears is an example of the object shown in the captured image.

As shown in FIG. 9, first, in the case of not detecting the shirt ("No" in Step S21), the detection unit 111 returns to Step S21. On the other hand, in the case of detecting the shirt ("Yes" in Step S21), the detection unit 111 detects the state of the shirt. In the case where it is determined that the subject 21 tucks the shirt in the trousers ("Yes" in Step S22), the image processing unit 112 superimposes the whole pair of trousers on the captured image (Step S23).

On the other hand, in the case where it is detected that the subject 21 wears the shirt in a state the shirt hanging out of the trousers ("No" in Step S22), the image processing unit 112 superimposes a part of the trousers that is not overlapped with the shirt on the captured image (Step S24). The display unit 130 may be controlled by the display control unit 113 such that a captured image processed by the image processing unit 112 is displayed on the display unit 130.

Heretofore, the flow of operation of the image processing apparatus 100 according to the first modified example has been described with reference to FIG. 9.

6. FUNCTIONS IN SECOND MODIFIED EXAMPLE

Subsequently, a second modified example of functions of the image processing unit 112 will be described with reference to FIGS. 10 to 12. FIG. 10 is a diagram illustrating a second modified example of a function of the image processing unit 112.

For example, in the case where a type of an object shown in a captured image is detected, the image processing unit 112 may combine a virtual object with the captured image, by processing of combining, with the captured image, the virtual object selected in accordance with the type of the object shown in the captured image. Further, in the case where the type of the object shown in the captured image is detected, the image processing unit 112 may combine the virtual object with the captured image, by modifying another object shown in the captured image into a shape corresponding to the type of the object shown in the captured image.

FIG. 10 shows an object 31E as an example of the object shown in a captured image 131E, and an object 32E as an example of the other object shown in the captured image 131E. Further, FIG. 10 shows an object 33E as an example of the other object. In the example shown in FIG. 10, the object 31E is a necklace having a short length in a vertical direction (for example, necklace having a length $x_1$ in the vertical direction, which is shorter than a threshold), the object 32E is clothes that the subject 21 wears, and the object 33E is round neck clothes. However, the object 31E, the object 32E, and the object 33C are not particularly limited.

In the captured image 131E, the subject 21 wears the necklace having a short length in the vertical direction. By looking at the displayed captured image 131E, the subject 20 can know how he/she would look when he/she has worn the necklace having a short length in the vertical direction. However, in the case where the subject 20 tries on a necklace in a shop, for example, the subject 20 may not be wearing clothes suitable for the necklace. Thus, the subject 20 grasps, from the captured image 131E, an appearance different from how he/she would look when he/she has changed into clothes suitable for the necklace.

Accordingly, the image processing unit 112 may modify the shape of the clothes in accordance with the detected type of an accessory. FIG. 10 shows a captured image 131E' in which the shape of the clothes is changed to the round neck by the image processing unit 112, since the necklace having a short length in the vertical direction has been detected. The type of the accessory is detected by the detection unit 111, and the detection method is not particularly limited. For example, the type of the accessory may be detected by a method of recognizing the type of an object as described above.

The method of changing the shape of the clothes is also not particularly limited. For example, in the case where a necklace having a short length in the vertical direction is detected, the image processing unit 112 may change the shape of the clothes by processing of combining, with the captured image, round neck clothes that is suited to the necklace having a short length in the vertical direction. Further, for example, in the case where the necklace having a short length in the vertical direction is detected, the image processing unit 112 may change the shape of the clothes by modifying the clothes shown in the captured image 131E into the round neck shape, which is a shape that is suited to the necklace having a short length in the vertical direction.

Note that, although the subject 20 wears the accessory existing in the real space in the example shown in FIG. 10, processing of changing the shape of the clothes may also be executed even in the case where an accessory serving as a virtual object is superimposed on the subject 21.

FIG. 11 is a diagram illustrating the second modified example of a function of the image processing unit 112. FIG. 11 shows an object 31F as an example of the object shown in a captured image 131F, and an object 32F as an example of the other object shown in the captured image 131F. Further, FIG. 11 shows an object 33F as an example of the other object. In the example shown in FIG. 11, the object 31F is a necklace having a long length in the vertical direction (for example, necklace having a length $x_2$ in the vertical direction, which is longer than a threshold), the object 32F is clothes that the subject 21 wears, and the object 33F is V-neck clothes. However, the object 31F, the object 32F, and the object 33F are not particularly limited.

FIG. 11 shows a captured image 131F' in which the shape of the clothes has been changed to the V-neck by the image processing unit 112, since the necklace having a long length in the vertical direction has been detected. For example, in the case where a necklace having a long length in the vertical direction is detected, the image processing unit 112 may change the shape of the clothes by processing of combining, with the captured image, V-neck clothes that are suited to the necklace having a long length in the vertical direction. Further, for example, in the case where the necklace having a long length in the vertical direction is detected, the image processing unit 112 may change the shape of the clothes by modifying the clothes shown in the captured image 131F into the V-neck shape, which is a shape that is suited to the necklace having a long length in the vertical direction.

FIG. 12 is a diagram illustrating the second modified example of a function of the image processing unit 112. FIG. 12 shows an object 31G as an example of the object shown in a captured image 131G, and an object 32G as an example of the other object shown in the captured image 131F. Further, FIG. 12 shows an object 33G as an example of the other object. In the example shown in FIG. 12, the object 31G is an earring, the object 32G is clothes that the subject 21 wears, and the object 33G is boat neck clothes. However, the object 31G, the object 32G, and the object 33G are not particularly limited.

FIG. 12 shows a captured image 131G' in which the shape of the clothes has been changed to the boat neck by the image processing unit 112, since the earrings are detected. For example, in the case where earrings are detected, the image processing unit 112 may change the shape of the clothes by processing of combining, with the captured image, boat neck clothes that are suited to the earrings. Further, for example, in the case where the earrings are detected, the image processing unit 112 may change the shape of the clothes by modifying the clothes shown in the captured image 131G into the boat neck shape, which is a shape that is suited to the earrings.

Heretofore, the second modified example of the functions of the image processing apparatus 100 according to the embodiment of the present disclosure has been described with reference to FIGS. 10 to 12. In the following, an example of a flow of operation of the image processing apparatus 100 according to the second modified example will be described with reference to FIG. 13.

7. OPERATION IN SECOND MODIFIED EXAMPLE

Figure 13:
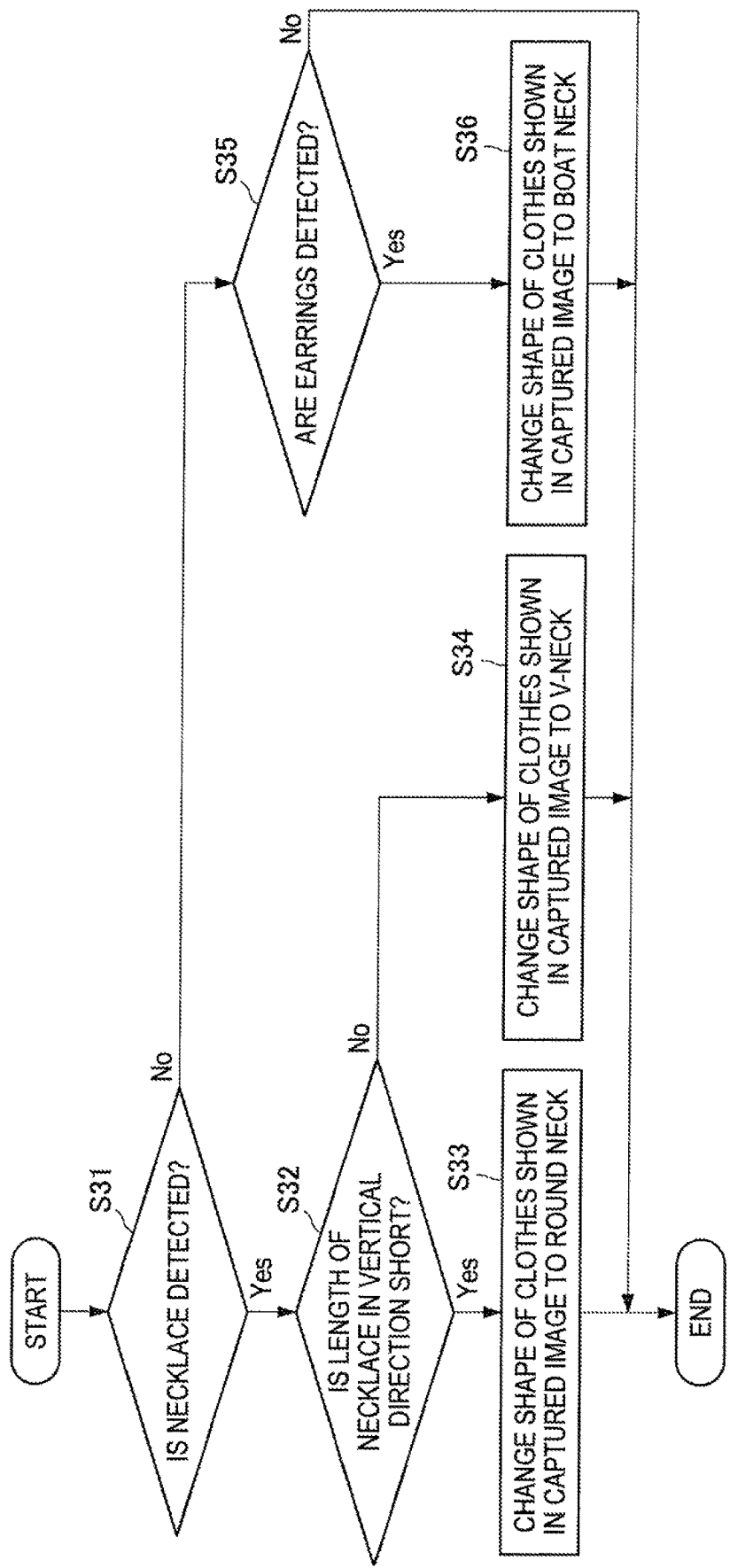
FIG. 13 is a flowchart showing a flow of operation of an image processing apparatus according to the second modified example.

FIG. 13 is a flowchart showing a flow of operation of the image processing apparatus 100 according to the second modified example. Note that the operation of the image processing apparatus 100 to be described with reference to FIG. 13 is particularly operation of the image processing apparatus 100 in the case of detecting a type of an accessory that the subject 20 wears. The accessory that the subject 20 wears is an example of the object shown in the captured image.

As shown in FIG. 13, first, the detection unit 111 detects the type of the accessory shown in the captured image. In the case of detecting the necklace from the captured image ("Yes" in Step S31), the detection unit 111 detects the length of the necklace in the vertical direction. In the case where the detection unit 111 detects that the length of the necklace in the vertical direction is short ("Yes" in Step S32), the image processing unit 112 changes the shape of the clothes shown in the captured image to the round neck (Step S33).

On the other hand, in the case where the detection unit 111 detects that the length of the necklace in the vertical direction is long ("No" in Step S32), the image processing unit 112 changes the shape of the clothes shown in the captured image to the V-neck (Step S34). In the case where the necklace is not detected on the captured image by the detection unit 111 ("No" in Step S31), and earrings are detected from the captured image ("Yes" in Step S35), the image processing unit 112 changes the shape of the clothes shown in the captured image to the boat neck (Step S36). The display unit 130 may be controlled by the display control unit 113 such that a captured image processed by the image processing unit 112 is displayed on the display unit 130.

Heretofore, the flow of operation of the image processing apparatus 100 according to the second modified example has been described with reference to FIG. 13.

8. FUNCTIONS IN THIRD MODIFIED EXAMPLE

Figure 14:
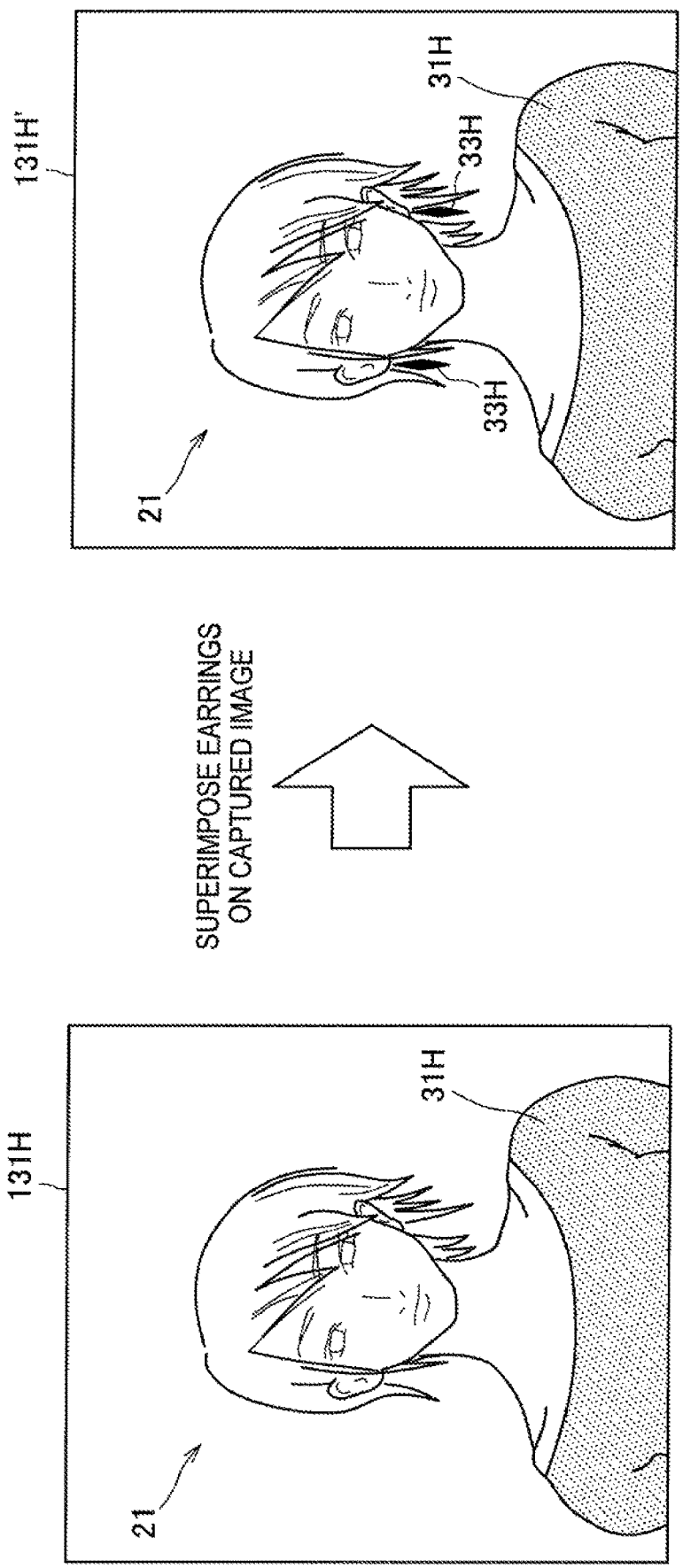
FIG. 14 is a diagram illustrating a third modified example of a function of the image processing unit.

Subsequently, a third modified example of functions of the image processing unit 112 will be described with reference to FIGS. 14 to 16. FIG. 14 is a diagram illustrating a third modified example of a function of the image processing unit 112.

FIG. 14 shows an object 31H as an example of the object shown in a captured image 131H. Further, FIG. 14 shows an object 33H as an example of the other object. In the example shown in FIG. 14, the object 31H is boat neck clothes, and the object 33H is an earring. However, the object 31H and the object 33H are not particularly limited.

In the captured image 131H, although the subject 21 wears the clothes, the subject 21 does not wear any accessories. For example, if an accessory suitable for the clothes that the subject 21 wears is combined with the captured image 131H, the subject 20 can know the accessory suitable for the clothes that he/she wears by looking at the captured image with which the accessory is combined. Further, it is highly likely that the subject 20 may like the accessory.

Accordingly, the image processing unit 112 may change the type of the accessory to be combined with the captured image depending on the detected type of clothes. FIG. 14 shows a captured image 131H' in which earrings are combined by the image processing unit 112, since the boat neck clothes are detected. It is more preferred that the earrings to be combined here be hanging down earrings. This is because it is expected that the balance as a whole becomes better by making it look long in the vertical direction using the earrings. The type of the clothes is detected by the detection unit 111, and the detection method is not particularly limited. For example, the type of the clothes may be detected by a method of recognizing the type of an object as described above.

Note that, although the subject 20 wears the clothes existing in the real space in the example shown in FIG. 14, processing of changing the type of the accessory may also be executed even in the case where the clothes serving as a virtual object is superimposed on the subject 21.

Figure 15:
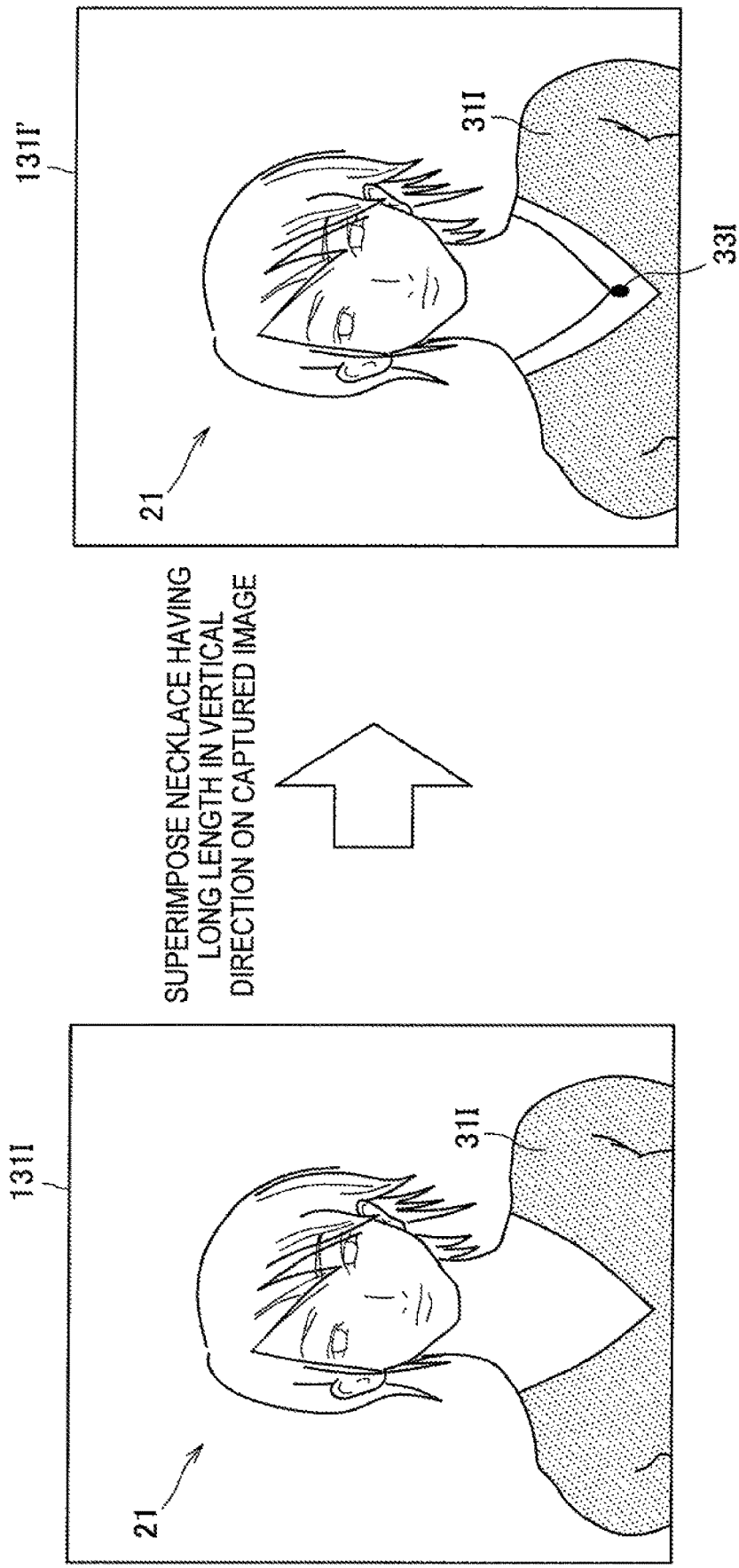
FIG. 15 is a diagram illustrating the third modified example of a function of the image processing unit.

FIG. 15 is a diagram illustrating the third modified example of a function of the image processing unit 112. FIG. 15 shows an object 31I as an example of the object shown in a captured image 131I. Further, FIG. 15 shows an object 33I as an example of the other object. In the example shown in FIG. 15, the object 31I is V-neck clothes, and the object 33I is a necklace having a long length in the vertical direction. However, the object 31I and the object 33I are not particularly limited.

FIG. 15 shows a captured image 131I' in which the necklace having a long length in the vertical direction is combined by the image processing unit 112, since the V-neck clothes is detected.

Figure 16:
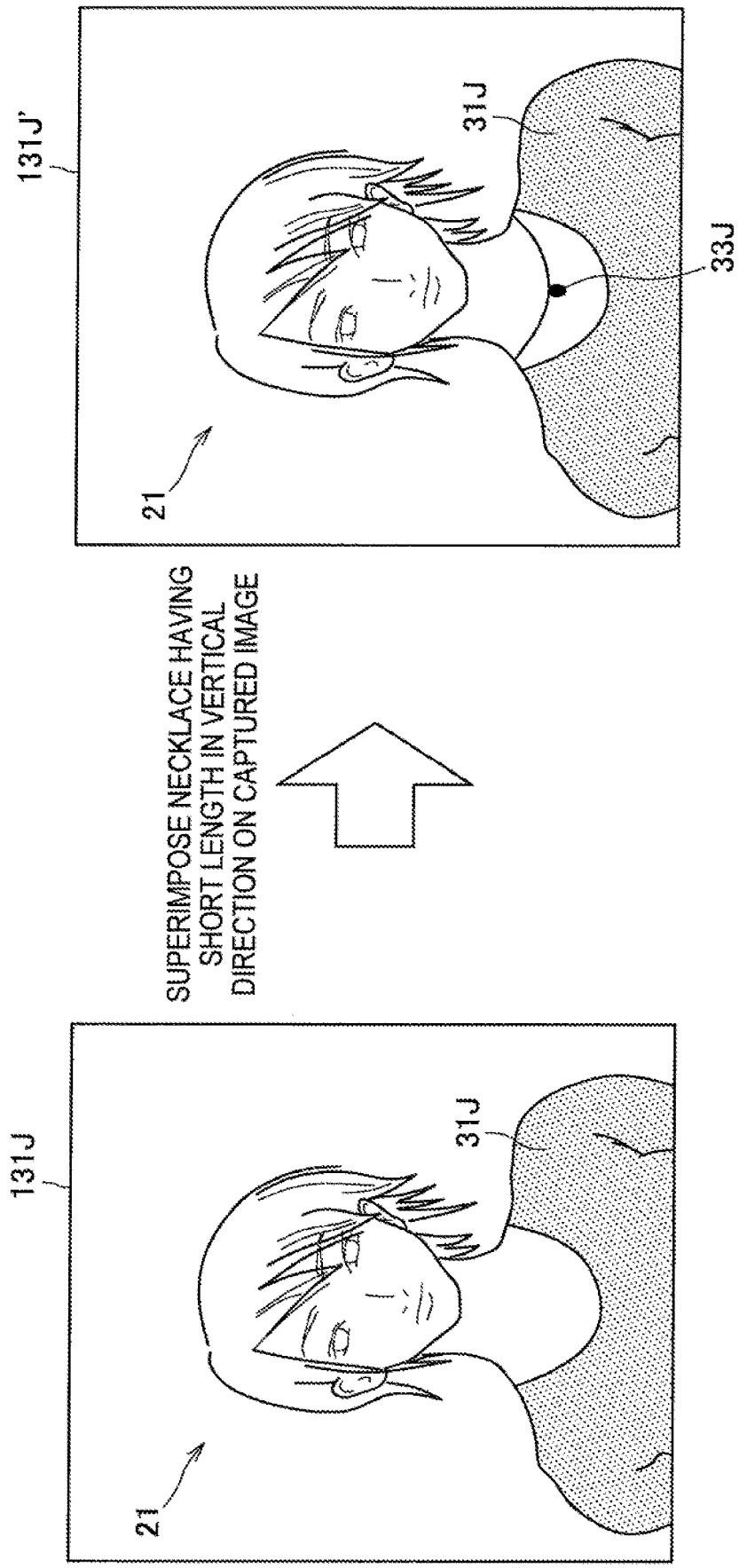
FIG. 16 is a diagram illustrating the third modified example of a function of the image processing unit.

FIG. 16 is a diagram illustrating the third modified example of a function of the image processing unit 112. FIG. 16 shows an object 31J as an example of the object shown in a captured image 131J. Further, FIG. 16 shows an object 33J as an example of the other object. In the example shown in FIG. 16, the object 31J is round neck clothes, and the object 33J is a necklace having a short length in the vertical direction. However, the object 31J and the object 33J are not particularly limited.

FIG. 16 shows a captured image 131J' in which the necklace having a short length in the vertical direction is combined by the image processing unit 112, since the round neck clothes is detected.

9. OPERATION IN THIRD MODIFIED EXAMPLE

Figure 17:
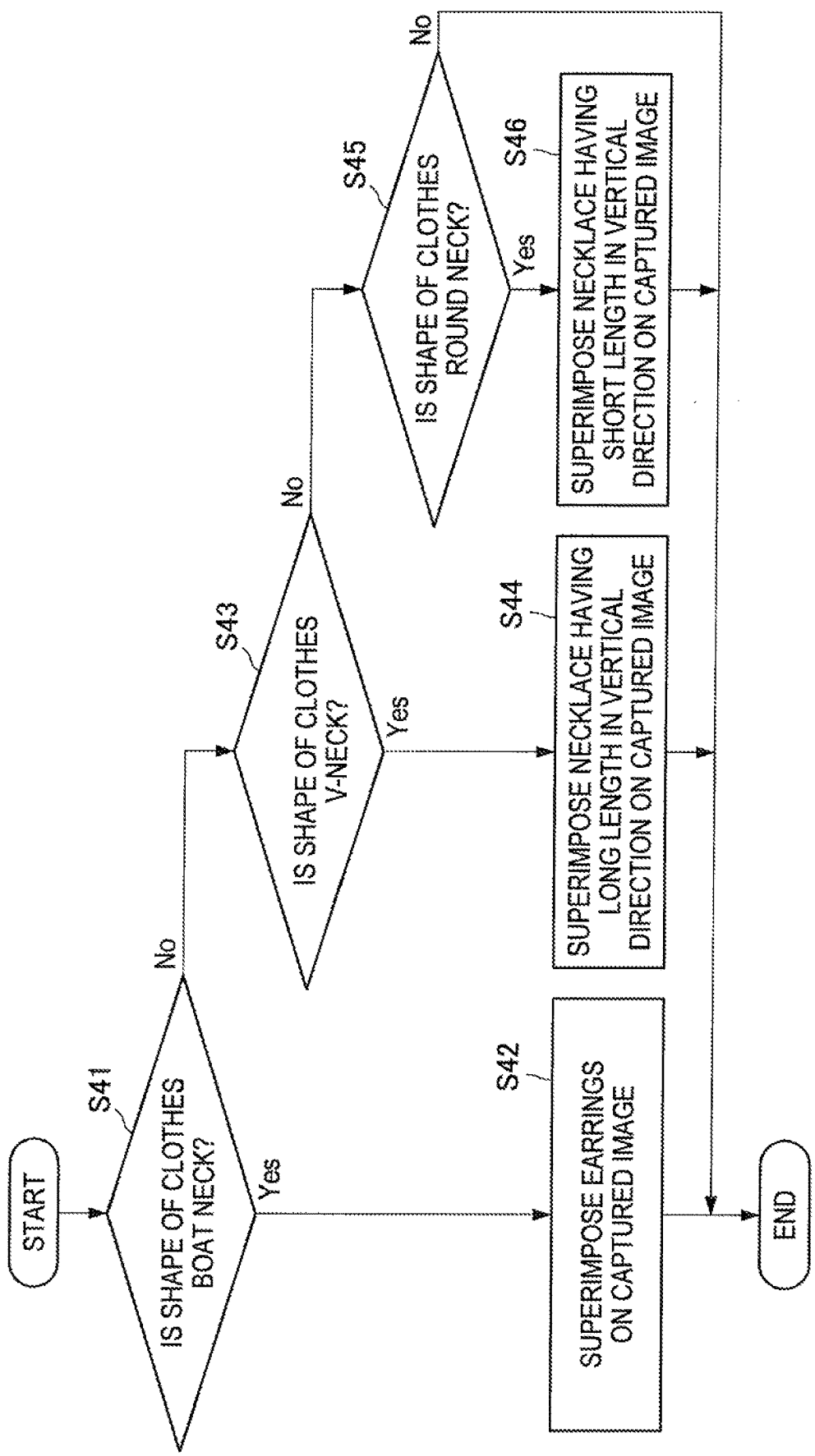
FIG. 17 is a flowchart showing a flow of operation of an image processing apparatus according to the third modified example.

FIG. 17 is a flowchart showing a flow of operation of the image processing apparatus 100 according to the third modified example. Note that the operation of the image processing apparatus 100 to be described with reference to FIG. 17 is particularly operation of the image processing apparatus 100 in the case of detecting a type of clothes that the subject 20 wears. The clothes that the subject 20 wears are an example of the object shown in the captured image.

As shown in FIG. 17, first, the detection unit 111 detects the type of the clothes shown in the captured image. In the case where the detection unit 111 detects that the shape of the clothes is the boat neck ("Yes" in Step S41), the image processing unit 112 superimposes earrings on the captured image (Step S33). On the other hand, in the case where the detection unit 111 detects that the shape of the clothes is not the boat neck ("No" in Step S41), the image processing unit 112 proceeds to Step S43.

In the case where the detection unit 111 detects that the shape of the clothes is the V-neck ("Yes" in Step S43), the image processing unit 112 superimposes a necklace having a long length in the vertical direction on the captured image (Step S44). On the other hand, in the case where the detection unit 111 detects that the shape of the clothes is not the V-neck ("No" in Step S43), the image processing unit 112 proceeds to Step S45.

In the case where the detection unit 111 detects that the shape of the clothes is the round neck ("Yes" in Step S45), the image processing unit 112 superimposes a necklace having a short length in the vertical direction on the captured image (Step S46). The display unit 130 may be controlled by the display control unit 113 such that a captured image processed by the image processing unit 112 is displayed on the display unit 130. Heretofore, the flow of operation of the image processing apparatus 100 according to the first modified example has been described with reference to FIG. 17.

10. CONCLUSION

As described above, according to the embodiments of the present disclosure, an image processing apparatus is provided which includes an image processing unit for combining a virtual object with a captured image, where the image processing unit determines the virtual object based on the state or the type of an object shown in the captured image. According to such an image processing apparatus, a virtual object can be determined taking into account the state or the type of an object shown in a captured image. According to such an image processing apparatus, an excess part of clothes shown in the captured image that comes out of other clothes can be erased, and new clothes can be combined in a manner to reflect the way a user wears clothes, for example. Further, an accessory that matches the clothes that the user wears can be combined with the captured image, and the clothes can be changed to the shape that matches the accessory worn by the user.

It should be understood by those skilled in the art that various modifications, combinations, sub-combinations and alterations may occur depending on design requirements and other factors insofar as they are within the scope of the appended claims or the equivalents thereof.

For example, the image processing apparatus 100 including the image processing unit 112 may be provided in a server or in a terminal capable of communication with a server. Also, an example has been mainly described above where the function of detecting the state or the type of an object is provided in the image processing apparatus 100, but such a function may be provided in a device other than the image processing apparatus 100. For example, such a function may be provided in the sensor 150. For example, in the case where the image processing apparatus 100 transmits a captured image to another device, the other device may detect the state or the type of an object based on the captured image, instead of the image processing apparatus 100.

Further, for example, an example has been mainly described above where the display control unit 113 is provided in the image processing apparatus 100, but the display control unit 113 may be provided in a device other than the image processing apparatus 100. For example, the image processing unit 112 may be provided in a server, and the display control unit 113 may be provided in a terminal. For example, in the case where a captured image processed by a server is transmitted to a terminal, the terminal may control the display unit 130 such that the captured image is displayed by the display unit 130. In this manner, the technology of the present disclosure can be applied also to cloud computing.

Further, for example, in the third modified example, an example has been mainly described where the image processing unit 112 changes the shape of the clothes in accordance with the type of the accessory, and changes the type of the accessory in accordance with the shape of the clothes. That is, the virtual object is determined taking into account the compatibility of the type of the accessory with the shape of the clothes. However, in addition to the combination of the accessory and the shape of the clothes, there are combinations which influence the compatibility. For example, the combination of the length of a skirt and the length of boots influences the compatibility. Accordingly, the image processing unit 112 can also determine the virtual object by taking into account the compatibility of the length of the skirt with the length of the boots. In the same manner, the image processing unit 112 can also determine the virtual object by taking into account the compatibility of the height of shoes (for example, height of heels and length of boots) with the length of trousers.

Further, in the case where the detection unit 111 detects a belt, the image processing unit 112 may perform image processing in a manner that a waist part of a one-piece dress that is worn with the belt by a subject is tightened. The one-piece dress worn by the subject may be superimposed on the captured image, or may be shown in the captured image. If such image processing is performed, the subject can know how he/she would look when he/she has worn the one-piece dress with the belt, without actually performing, by the subject, the operation of tightening the one-piece dress with the belt. Further, the image processing unit 112 may also determine the virtual object taking into account the compatibility of clothes. For example, in the case where the wearing of a muffler is detected, the image processing unit 112 may determine the virtual object in a manner to change the sleeves of the clothes that is worn with the muffler from the short sleeves to the long sleeves. If such image processing is performed, even when the season in which the subject is trying on the clothes is different from the season in which the subject actually wears the clothes, for example, the subject can know more accurately how he/she would look when he/she has worn the clothes.

Further, respective steps included in the operation of the image processing apparatus 100 of the present specification are not necessarily processed in chronological order in accordance with the flowcharts. For example, the respective steps included in the operation of the image processing apparatus 100 may be processed in different order from the flowcharts, or may be processed in a parallel manner.

Further, it is also possible to create a computer program for causing hardware such as a CPU, a ROM, and a RAM, which are built in the image processing apparatus 100, to exhibit equivalent functions as those of respective structures of the image processing apparatus 100 described above. Further, there is also provided a storage medium having the computer program stored therein. Additionally, the present technology may also be configured as below.

(1) An image processing apparatus including
an image processing unit which combines a virtual object with a captured image,
wherein the image processing unit determines the virtual object based on a state or a type of an object shown in the captured image.

(2) The image processing apparatus according to (1),
wherein, in a case where an adjacency of an object shown in the captured image and a predetermined object shown in the captured image is detected, the image processing unit combines a virtual object with the captured image by processing of replacing the object shown in the captured image with another object.

(3) The image processing apparatus according to (1),
wherein, in a case where an adjacency of an object shown in the captured image and a predetermined object superimposed on the captured image is detected, the image processing unit combines a virtual object with the captured image by processing of replacing the object shown in the captured image with another object.

(4) The image processing apparatus according to (2) or (3),
wherein the adjacency of the object shown in the captured image and the predetermined object is detected based on at least one of a color or a shape of an object that is adjacent to the object shown in the captured image.

(5) The image processing apparatus according to (1), wherein, in a case where an overlap between an object shown in the captured image and a predetermined object shown in the captured image is detected, the image processing unit combines, with the captured image, a virtual object modified in accordance with the overlap.

(6) The image processing apparatus according to (5), wherein the overlap of the object shown in the captured image and the predetermined object is detected based on a position of a boundary line between the object shown in the captured image and the predetermined object.

(7) The image processing apparatus according to (1), wherein, in a case where a type of the object shown in the captured image is detected, the image processing unit combines, with the captured image, a virtual object selected in accordance with the type of the object shown in the captured image.

(8) The image processing apparatus according to (1), wherein, in a case where a type of the object shown in the captured image is detected, the image processing unit combines a virtual object with the captured image, by modifying another object shown in the captured image into a shape corresponding to the type of the object shown in the captured image.

(9) The image processing apparatus according to (1), further including
a detection unit which detects a state or a type of the object shown in the captured image.

(10) The image processing apparatus according to (1), further including
a display control unit which controls a display unit in a manner that an image that has been processed by the image processing unit is displayed on the display unit.

(11) An image processing method including determining, based on a state or a type of an object shown in a captured image, a virtual object to be combined with the captured image.

(12) A program for causing a computer to function as an image processing apparatus, the image processing apparatus including an image processing unit which combines a virtual object with a captured image,
wherein the image processing unit determines the virtual object based on a state or a type of an object shown in the captured image.

The present disclosure contains subject matter related to that disclosed in Japanese Priority Patent Application JP 2011-244377 filed in the Japan Patent Office on Nov. 8, 2011, the entire content of which is hereby incorporated by reference.

What is claimed is:
1. An image processing method, comprising:
   detecting a first object from a captured image, wherein the first object corresponds to a first portion of a first living object;
   detecting a second object from the captured image, wherein the second object is different from the first object;
   detecting a position of a boundary line between the first object and the second object;
   detecting an overlap between the first object and the second object based on the detected position of the boundary line;
   generating a virtual object based on the detected position of the boundary line;
   modifying the virtual object based on the detected overlap between the first object and the second object; and
   displaying a modified image that includes the modified virtual object superimposed onto at least one portion of the second object.

2. The image processing method according to claim 1, further comprising determining a shape of the virtual object based on the detected position of the boundary line.

3. The image processing method according to claim 1, wherein
   the second object corresponds to a second portion of the first living object, and
   the second portion is different from the first portion of the first living object.

4. The image processing method according to claim 1, further comprising modifying a size of the virtual object based on the second object.

5. The image processing method according to claim 1, wherein the first object and the second object are wearable by the first living object.

6. The image processing method according to claim 1, wherein the second object corresponds to a portion of a second living object.

7. An image processing apparatus, comprising:
   a central processing unit (CPU) configured to:
      detect a first object from a captured image, wherein the first object corresponds to a first portion of a first living object;
      detect a second object from the captured image, wherein the second object is different from the first object;
      detect a position of a boundary line between the first object and the second object;
      detect an overlap between the first object and the second object based on the detected position of the boundary line;
      generate a virtual object based on the detected position of the boundary line;
      modify the virtual object based on the detected overlap between the first object and the second object; and
      control a display screen to display a modified image that includes the modified virtual object superimposed onto at least one portion of the second object.

8. The image processing apparatus according to claim 7, wherein the CPU is further configured to determine a shape of the virtual object based on the detected position of the boundary line.

9. The image processing apparatus according to claim 7, wherein
   the second object corresponds to a second portion of the first living object, and
   the second portion is different from the first portion of the first living object.

10. The image processing apparatus according to claim 7, wherein the CPU is further configured to modify a size of the virtual object based on the second object.

11. The image processing apparatus according to claim 7, wherein the first object and the second object are wearable by the first living object.

12. The image processing apparatus according to claim 7, wherein the second object corresponds to a portion of a second living object.

13. A non-transitory computer-readable medium having stored thereon computer-executable instructions that, when executed by a processor, cause the processor to execute operations, the operations comprising:

detecting a first object from a captured image, wherein the first object corresponds to a first portion of a first living object;

detecting a second object from the captured image, wherein the second object is different from the first object;

detecting a position of a boundary line between the first object and the second object;

detecting an overlap between the first object and the second object based on the detected position of the boundary line;

generating a virtual object based on the detected position of the boundary line;

modifying the virtual object based on the detected overlap between the first object and the second object; and controlling a display screen to display a modified image that includes the modified virtual object superimposed onto at least one portion of the second object.

14. The non-transitory computer-readable medium according to claim 13, further comprising determining a shape of the virtual object based on the detected position of the boundary line.

15. The non-transitory computer-readable medium according to claim 13, wherein
the second object corresponds to a second portion of the first living object, and
the second portion is different from the first portion of the first living object.

16. The non-transitory computer-readable medium according to claim 13, further comprising modifying a size of the virtual object based on the second object.

17. The non-transitory computer-readable medium according to claim 13, wherein the first object and the second object are wearable by the first living object.

18. The non-transitory computer-readable medium according to claim 13, wherein the second object corresponds to a portion of a second living object.

* * * * *